United States Patent
Okumura et al.

(10) Patent No.: US 12,504,742 B2
(45) Date of Patent: Dec. 23, 2025

(54) INTERMEDIATE PROCESSING METHOD FOR EXTRUDED RESIN SHEET AND HEAT PRESS PROCESSING METHOD FOR INTERMEDIATE RESIN SHEET WITH EXTRUDED RESIN SHEET SUBJECTED TO INTERMEDIATE PROCESSING

(71) Applicants: KABUSHIKI KAISHA TOYOTA JIDOSHOKKI, Kariya (JP); TEIJIN LIMITED, Osaka (JP)

(72) Inventors: Kazumasa Okumura, Kariya (JP); Toshiaki Hotaka, Osaka (JP)

(73) Assignees: KABUSHIKI KAISHA TOYOTA JIDOSHOKKI, Kariya (JP); TEIJIN LIMITED, Osaka (JP)

( * ) Notice: Subject to any disclaimer, the term of this patent is extended or adjusted under 35 U.S.C. 154(b) by 506 days.

(21) Appl. No.: 18/022,574

(22) PCT Filed: Aug. 5, 2021

(86) PCT No.: PCT/JP2021/029079
§ 371 (c)(1),
(2) Date: Feb. 22, 2023

(87) PCT Pub. No.: WO2022/049988
PCT Pub. Date: Mar. 10, 2022

(65) Prior Publication Data
US 2023/0333538 A1  Oct. 19, 2023

(30) Foreign Application Priority Data
Sep. 2, 2020 (JP) .................................. 2020-147629

(51) Int. Cl.
G06F 3/048 (2013.01)
G05B 19/4155 (2006.01)

(52) U.S. Cl.
CPC .................... *G05B 19/4155* (2013.01); *G05B 2219/45244* (2013.01)

(58) Field of Classification Search
CPC ...... G05B 19/4155; G05B 2219/45244; B29C 43/34; B29C 43/58; B29C 48/0018;
(Continued)

(56) References Cited
U.S. PATENT DOCUMENTS
2019/0364705 A1    11/2019   Kubota FOREIGN PATENT DOCUMENTS
CN    112140413 B  *  4/2022  ......... B29C 33/3835
JP    49-078764 A      7/1974
(Continued)

OTHER PUBLICATIONS
International Preliminary Report on Patentability dated Mar. 7, 2023 in International Application No. PCT/JP2021/029079.
(Continued)

*Primary Examiner* — Aleksey Olshannikov
(74) *Attorney, Agent, or Firm* — Sughrue Mion, PLLC

(57) ABSTRACT

A process for forming an intermediate or final resin sheet by virtually segmenting a strip-like, extrusion-molded resin sheet into a plurality of individual areas corresponding to intermediate resin sheets. Each individual area is further virtually segmented into segmented areas. Shrinkage rate related information related to shrinkage rate of each segmented area is acquired for each segmented area. When implementing an intermediate processing, processing conditions are corrected for each individual area based on the shrinkage rate related information for each individual area and for each segmented area. The intermediate resin sheet may be heat press processed using heat press processing condition information.

14 Claims, 14 Drawing Sheets

(58) Field of Classification Search
CPC . B29C 48/305; B29C 48/9135; B29C 48/906; B29C 48/08; B29C 48/92; B29C 43/02; B29C 48/0011; B29C 48/0022; B29C 48/0023; B29C 48/21; B29C 48/91; B29C 51/02; B29C 53/04; B29C 55/02; B29C 2043/5875; B29C 2948/92152; B29C 2948/92209; B29C 2948/92219; B29C 2948/92647; B29C 2948/92923; B29C 2948/92933; Y02P 90/02
See application file for complete search history.

(56) References Cited

FOREIGN PATENT DOCUMENTS

| | | | |
|---|---|---|---|
| JP | 07-195506 A | | 8/1995 |
| JP | 2009149065 A | * | 7/2009 |
| JP | 2010-201712 A | | 9/2010 |
| JP | 2018-034562 A | | 3/2018 |
| JP | 2019181801 A | * | 10/2019 |
| WO | 2018/131066 A1 | | 7/2018 |

OTHER PUBLICATIONS

International Search Report for PCT/JP2021/029079 dated Oct. 19, 2021.
Written Opinion for PCT/JP2021/029079 dated Oct. 19, 2021.

* cited by examiner

[Shrinkage Rate Related Information]

| Item \ Area | (A, 1) | (A, 2) | ... | (D, 4) |
|---|---|---|---|---|
| Roller Temperature TRw1, Roller Rotation Numbers RRw1, Sheet Temperature TSw1 | | | | |
| Sheet Thickness Distribution | H11 ~ H12 | H21 ~ H22 | ... | H91 ~ H92 |
| Temperature Distribution | T11 ~ T12 | T21 ~ T22 | ... | T91 ~ T92 |
| Refractive Index Distribution | K11 ~ K12 | K21 ~ K22 | ... | K91 ~ K92 |
| ⋮ | ⋮ | | ⋮ | ⋮ |

(Layered: Roller Temperature TRw2, Roller Rotation Numbers RRw2, Sheet Temperature TSw2; Roller Temperature TRw3, Roller Rotation Numbers RRw3, Sheet Temperature TSw3)

FIG. 5

[Heat Press Processing Condition Information]

W1[YMD-0001] (layered with W2[YMD-0002], W3[YMD-0003])

| Item \ Area | (A, 1) | (A, 2) | ... | (D, 4) |
|---|---|---|---|---|
| Heat Distribution | TP11 ~ TP12 | TP21 ~ TP22 | ... | TP91 ~ TP92 |
| Pressure Distribution | P11 ~ P12 | P21 ~ P22 | ... | P91 ~ P92 |
| Refractive Index Distribution | KR11 ~ KR12 | KR21 ~ KR22 | ... | KR91 ~ KR92 |
| ⋮ | ⋮ | ⋮ | ⋮ | — |

FIG. 6

[Contour Information]

W1[YMD-0001] (layered with W2[YMD-0002], W3[YMD-0003])

| | |
|---|---|
| Target Contour | (n1, m1), (n2, m2), ... |
| Pre-shrinkage Contour | (f1, g1), (f2, g2), ... |

FIG. 7

[Coating Thickness Information]

| W1[YMD-0001] | | | | | | |
|---|---|---|---|---|---|---|
| Item \ Area | (A, 1) | (A, 2) | ... | (B, 2) | ... | (D, 4) |
| Maximum Curvature | KR12 | KR22 | ... | KR62 | ... | KR92 |
| Maximum Allowable Coating Thickness | Ha1 | Ha2 | ... | Hb2 | ... | Hd4 |
| ⋮ | ⋮ | ⋮ | | ⋮ | | ⋮ |

FIG. 10

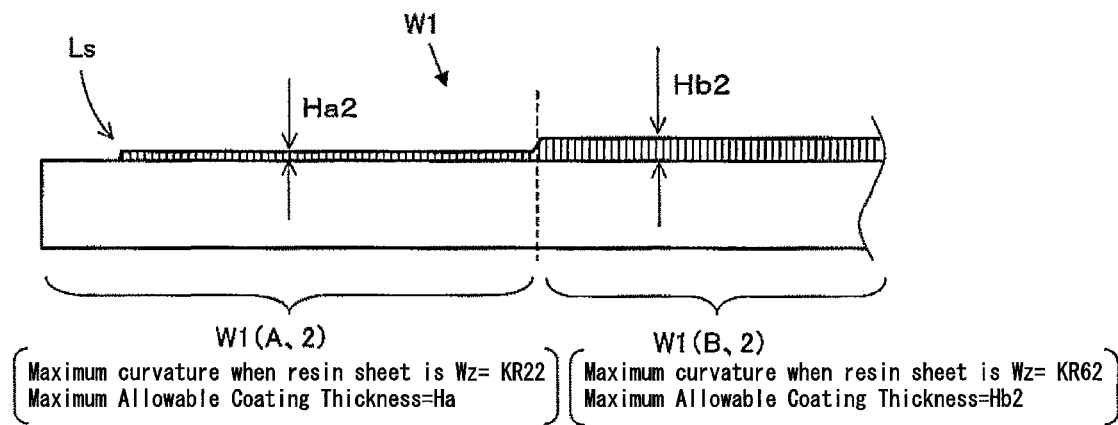

W1(A, 2)
Maximum curvature when resin sheet is Wz= KR22
Maximum Allowable Coating Thickness=Ha W1(B, 2)
Maximum curvature when resin sheet is Wz= KR62
Maximum Allowable Coating Thickness=Hb2

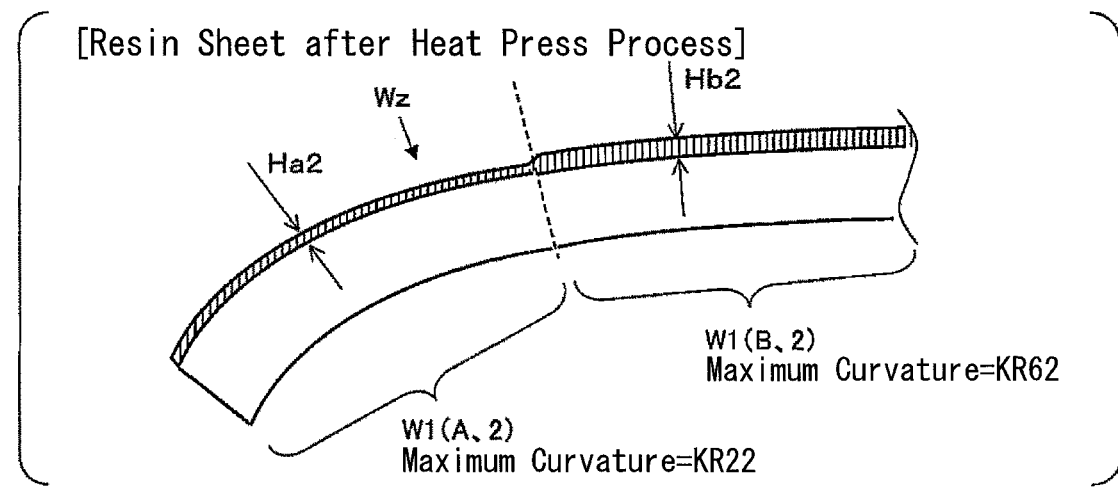

[Resin Sheet after Heat Press Process]

W1(A, 2) Maximum Curvature=KR22
W1(B, 2) Maximum Curvature=KR62

FIG. 11

[Final Product Inspection Information]

| W1[YMD-0001] | | | | |
|---|---|---|---|---|
| Item \ Area | (A, 1) | (A, 2) | ... | (D, 4) |
| Contour Error | $+\Delta Da1$ | $-\Delta Da2$ | ... | $+\Delta Dd4$ |
| Curvature Error | $-\Delta Ra1$ | $+\Delta Ra2$ | ... | $+\Delta Rd4$ |
| | | | . | : |

FIG 18

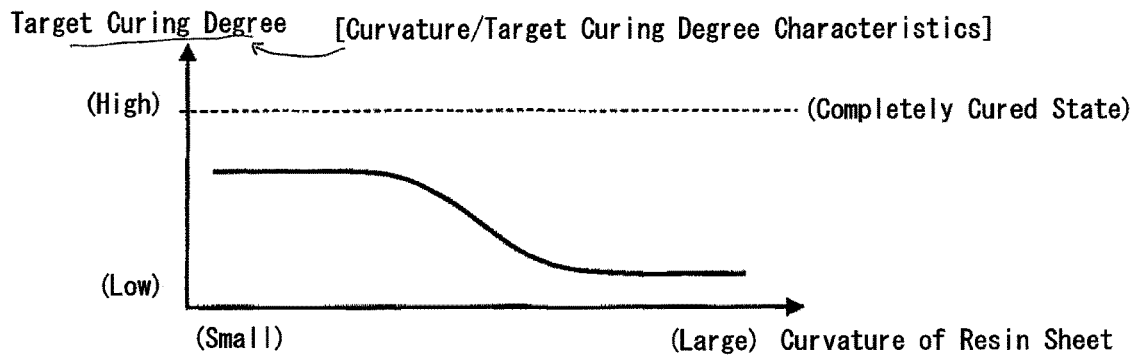
FIG. 20
[Curing Degree Information]
| W1[YMD-0001] | | | | | | |
|---|---|---|---|---|---|---|
| Item \ Area | (A, 1) | (A, 2) | ... | (B, 2) | ... | (D, 4) |
| Maximum Curvature | KR12 | KR22 | ... | KR62 | ... | KR92 |
| Target Curing Degree | Sa1 | Sa2 | ... | Sb2 | ... | Sd4 |
| | : | | | | | |
FIG. 21
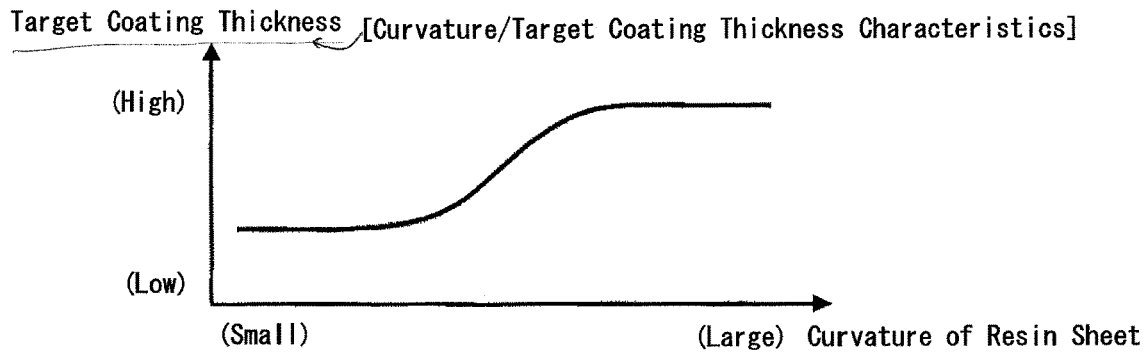
FIG. 22
[Coating Thickness Information]
| W1[YMD-0001] | | | | | | |
|---|---|---|---|---|---|---|
| Item \ Area | (A, 1) | (A, 2) | ... | (B, 2) | ... | (D, 4) |
| Maximum Curvature | KR12 | KR22 | ... | KR62 | ... | KR92 |
| Target Coating Thickness | Ta1 | Ta2 | ... | Tb2 | ... | Td4 |
| | : | : | : | | : | : |
FIG. 23

INTERMEDIATE PROCESSING METHOD FOR EXTRUDED RESIN SHEET AND HEAT PRESS PROCESSING METHOD FOR INTERMEDIATE RESIN SHEET WITH EXTRUDED RESIN SHEET SUBJECTED TO INTERMEDIATE PROCESSING

CROSS-REFERENCE TO RELATED APPLICATIONS

The present application is a U.S. National Phase entry of, and claims priority to, PCT Application PCT/JP2021/029079, filed Aug. 5, 2021, which claims priority to Japanese Patent Application No. 2020-147629, filed Sep. 2, 2020, both of which are incorporated herein by reference in their entireties for all purposes.

BACKGROUND

One embodiment of the present disclosure relates to a processing method for resin sheets. For example, a resin material can be subjected to extrusion molding while being heated to form a strip-like extruded resin sheet. An intermediate resin sheet to be used for heat press processing is manufactured from an extruded resin sheet. The present embodiments relate to an intermediate processing method of an extruded resin sheet, and a heat press processing method for an intermediate resin sheet with an extruded resin sheet subjected to intermediate processing.

For example, resin sheets with a thickness of thinner than or equal to several millimeters [mm] are widely used for various equipment in various fields. For example, transparent resin sheets with a thickness of about several millimeters [mm] are used for various parts of a vehicle, such as a rear window, or a roof for a vehicle equipped with a sunroof. However, if the resin sheets are used for such as a rear window or a roof, a flat plate-like resin sheet needs be shaped to have a curved shape. Specifically, a so-called heat press processing is required to heat, press, and shape a resin sheet.

When manufacturing a resin sheet, if the resin lot of the material changes, the residual stress, etc. experienced during extrusion change, which could cause a change in the shrinkage rate due to heat. Further, even in the same lot, when a flat plate-like and strip-like extruded resin sheet is extruded, temperature distribution, sheet thickness distribution, and the like may differ depending on the area of the resin sheet. As a result, the shrinkage rate differs depending on the area of the resin sheet. The dimensional variation due to the difference in shrinkage rate is, for example, about 1 to 5 percent [%], and the variation range is relatively large. Accordingly, it is desirable to reduce the variation in order to improve accuracy.

For example, a base material of a window member may be formed of a material containing a thermoplastic resin. A coat layer may be provided on at least one side of the base material. The base material has a heat shrinkage rate of less than or equal to 5%, as measured according to the method specified in JIS K 6735. An extruder is used in the method of manufacturing the window member. The pressure in the extruder is preferably set to 15 to 25 MPa. The temperature inside the extruder is preferably set to 260 to 280° C. A melted sheet (composed of the base material) output from the extruder is flattened via three rollers, such as a touch roller, a cooling roller, and a subsequent cooling roller. After that, the sheet is cooled by a plurality of cooling rollers, held between the two tension rollers, and sent out in a conveying direction. The heat shrinkage rate of the base material can be set to less than or equal to 5% by allowing the base material to go through each of these processes.

Using the above manufacturing methods, a coating layer forming process, a printing process, and a molding process are typically post-processing processes for the base material from the extruder. A coating layer (coating) is formed in an "application layer forming process" on the base material, the base material having a heat shrinkage rate of less than and equal to 5%. When forming a printed surface on the base material (when the "printing process" is included), printing is applied on the coat layer prior to the molding process to form a printed surface. In the "molding process", a windshield plate is obtained by heating a flat plate (made of the base material), pressing it against a die immediately after softening it to the level that it can be molded, and removing remaining parts of the flat plate along the contour thereof.

In other words, even though the heat shrinkage rate is less than or equal to 5%, how the sheet will shrink is not known until the heat pressing process is performed. Therefore, a relatively large flat plate is usually hot pressed and excessive parts are removed after shrinkage. This results in relatively high wastage of the base material. Further, when forming the coat layer, it is necessary to form the coat layer on the entire relatively large flat plate, because it is not conventionally possible to know which parts will become the excessive parts. This leads to a relatively large amount of waste of coating agent. Regarding printing, it is not known how to correct for the printing position and printing shape with respect to shrinkage, except by setting the heat shrinkage rate of the base material to be less than or equal to 5%. That is, since the base material is to be printed without knowing which area of and how the base material may shrink, printing misalignment may possibly occur after shrinkage.

Therefore, there is a need for sheet processing methods capable of reducing the amount of waste of the base materials and of the coating agent. There is also the need of reducing the occurrence of printing misalignment, and of manufacturing products with more stable accuracy. For example, there is a need for a sheet processing method that includes an intermediate processing method of an extruded resin sheet for manufacturing an intermediate rein sheet to be used for a heat press processing, or a heat press processing method for an intermediate resin sheet with an extruded resin sheet subjected to intermediate processing.

BRIEF SUMMARY

One aspect of the present disclosure relates to an intermediate processing method of an extruded resin sheet to manufacture an intermediate sheet. The intermediate sheet is a resin sheet to be subjected to heat press processing. The intermediate sheet is formed from a strip-like extruded resin sheet, which was heated and extrusion molded. A process management system including a computer is used in this method. Said process management system is configured to virtually segment the strip-like extruded resin sheet, which was subjected to the extrusion-molding, into a plurality of individual areas corresponding to a plurality of resin sheets. Each of the virtually segmented individual areas is further virtually segmented into a plurality of segmented areas. Shrinkage rate related information related to the shrinkage rate of each segmented area in each individual area is acquired for each of the individual areas and for each of the segmented areas. The process management system implements intermediate processing using process conditions corrected for each of the individual areas when implementing the intermediate processing to each of the individual areas. The intermediate processing is a processing after the extrusion-molding and before the heat press processing. Corrections are made to each of the individual areas based on the shrinkage rate related information for each of the individual areas and for each of the segmented areas. Corrections are also made for heat press processing condition information, which is processing condition information of the heat press processing for each of the individual areas and for each of the segmented areas.

As mentioned above, each individual area corresponding to each one of the products is further virtually segmented into a plurality of segmented areas. Then, the intermediate processing is implemented in which corrections are made to each of the individual areas based on the shrinkage related information and the heat press processing condition information for each of the individual areas and for each of the segmented areas. Respective heat shrinkage data (shrinkage rate related information, heat press processing condition information) is acquired for each one of the products made of a resin sheet having a different shrinkage rate depending on location (segmented areas). After that, the intermediate processing is implemented in which appropriate corrections have been made to each of the areas based on the heat shrinkage data. This makes it possible to reduce a waste of the base material, coating agent and so on. This also reduces the occurrence of printing misalignment. Accordingly, products can be manufactured with more stable accuracy.

According to another aspect of the present disclosure, the process management system virtually sets a target contour for each individual area before implementing the intermediate processing, the target contour being the contour corresponding to the resin sheet after completion of both the intermediate processing and the heat press processing. A contour calculation processing is implemented in which a pre-shrinkage contour, which is the contour before shrinking to the target contour, is calculated. This pre-shrinkage contour is virtually set for each of each individual area based on the shrinkage rate related information for each of the individual areas and for each of the segmented areas. The pre-shrinkage contour is also virtually set based on the heat press processing condition information for each of the individual areas and for each of the segmented areas. Further, the process management system implements a contour storing process, in which the target contour and the pre-shrinkage contour are stored so as to correspond to the individual areas. Furthermore, in the intermediate processing process, which is the process of the intermediate processing, the process management system implements a correction amount acquiring process, in which a correction amount is determined for each individual area. The correction amount is used in the intermediate processing. The correction amount is determined based on the target contour stored in the contour storing process and the pre-shrinkage contour before implementing the intermediate processing. The process management system then implements the intermediate processing implementing process for implementing the intermediate processing with corrections made to each of the individual areas based on the correction amount of each individual area determined in the correction amount acquiring process.

Therefore, the target contour, which is the contour of a resin sheet after completion of the intermediate processing and the heat press processing, and the pre-shrinkage contour, which is the contour before shrinking to the target contour, are calculated and stored. Since the correction amount of each intermediate processing is determined for each individual area based on each specific pre-shrinkage contour and target contour, an appropriate correction can be made for each individual area. Therefore, it is possible to reduce a waste of the base material, coating agent and so on, as well as reducing the occurrence of printing misalignment. Accordingly, products can be manufactured with more stable accuracy by implementing the intermediate processing with appropriate corrections for each individual area.

According to another aspect of the present disclosure, the intermediate processing implementing process includes a coating implementing process to apply coating on a surface of the extruded resin sheet. The process management system determines the correction amount of each of the individual areas in the correction amount acquiring process corresponding to the coating implementing process. The correction amount may be determined by setting, for each of the individual areas, a range within which to apply coating on the individual area based on the configuration of the pre-shrinkage contour corresponding to the individual area.

According to another aspect of the present disclosure, a print implementing process to apply printing on a surface of the extruded resin sheet is included in the intermediate processing implementing process. The process management system determines the correction amount of the individual area in the correction amount acquiring process corresponding to the print implementing process. The correction amount may be determined by determining a range which is to be printed in the individual area, a shape, and a contraction scale for each of the individual areas based on the pre-shrinkage contour corresponding to the individual area, the target contour, the shrinkage rate related information for each of the segmented areas, and the heat press processing condition information. Therefore, it is possible to reduce the occurrence of printing misalignment or distortion for each of the individual areas.

According to another aspect of the present disclosure, the intermediate processing implementing process includes a trimming implementing process in which the area corresponding to the resin sheet is cut out of the individual area of the strip-like extruded resin sheet. The process management system determines a correction amount of each area in the correction amount acquiring process corresponding to the trimming implementing process. The correction amount may be determined by setting, for each individual area, an area to be cut out of the individual area based on the range of the pre-shrinkage contour corresponding to the individual area. Therefore, the area that can be shrunk to the target contour may appropriately be cut from the strip-like extruded resin sheet for the individual area.

According to another aspect of the present disclosure, the shrinkage rate related information contains at least one of: a temperature of each individual area of the extruded resin sheet subjected to the extrusion molding, a temperature of a roller used for the extrusion molding, a rotation number of the roller, a sheet thickness distribution of each of the segmented areas, a temperature distribution of each of the segmented areas, and/or a refractive index distribution of each of the segmented areas. It is thus possible to obtain appropriate information that can be used for determining the shrinkage rate related information.

According to another aspect of the present disclosure, the heat press processing condition information contains at least one of: a heating distribution of each of the segmented areas corresponding to the individual areas, and/or a pressure distribution of each of the segmented areas. It is thus possible to obtain appropriate information that can be used for the heat press processing condition information.

Another aspect of the present disclosure relates to a heat press processing method of an intermediate resin sheet, which was subjected to an intermediate processing. The intermediate resin sheet is from a strip-like extruded resin sheet that has been heated and extrusion molded. This method utilizes a process management system including a computer. The process management system virtually segments the strip-like extruded resin sheet, which was subjected to the extrusion-molding, into a plurality of individual areas corresponding to a plurality of intermediate resin sheets. Each of the virtually segmented individual areas is further virtually segmented into a plurality of the segmented areas. The shrinkage rate related information, which is related to the shrinkage rate of each segmented area of each individual area, is acquired for each of the individual areas and for each of the segmented areas. The intermediate processing is performed after the extrusion-molding and before the heat press processing. The process management system implements the heat press processing when applying the heat press processing to each of the intermediate resin sheets, which is each of the resin sheets subjected to the intermediate processing. The heat press processing is implemented based on the shrinkage rate related information for each of the individual areas and for each of the segmented areas. This process is also implemented based on the heat press processing condition information. The heat press processing condition information is corrected for at least some of the individual areas based on the heat press processing condition information, which is the processing condition information of the heat press processing for each of the individual areas and for each of the segmented areas. The heat press processing condition information is also corrected based on intermediate processing condition information, which is the processing condition information of the intermediate processing for each of the individual areas and for each of the segmented areas.

As described above, the heat press processing condition information is corrected based on the heat press processing condition information and the intermediate processing condition information for each of the individual areas and for each of the segmented areas. The heat press processing is implemented based of the corrected heat press processing condition information and the shrinkage rate related information for each of the individual areas and for each of the segmented areas. As a result, the heat press processing is appropriately corrected for each of the individual areas. Further, since further corrections are made to the heat press processing condition information to correct for each of the individual areas, products with more stable accuracy can be manufactured.

Another aspect of the present disclosure relates to a heat press processing method of an intermediate resin sheet, which was subjected to an intermediate processing. The intermediate resin sheet is from a strip-like extruded resin sheet that has been heated and extrusion molded. This method utilizes a process management system including a computer. The process management system virtually segments the strip-like extruded resin sheet, which was subjected to the extrusion-molding, into a plurality of individual areas corresponding to a plurality of resin sheets. Each of the virtually segmented individual areas is further virtually segmented into a plurality of the segmented areas. The shrinkage rate related information related to the shrinkage rate of each segmented area of each individual area is acquired for each of the individual areas and for each of the segmented areas. The intermediate processing is the processing that occurs after the extrusion-molding and before the heat press processing. The process management system implements the heat press processing based on the shrinkage rate related information for each of the individual areas and for each of the segmented areas. The heat press processing is also based on the heat press processing condition information, which is the processing condition information of the heat press processing for each of the individual areas and for each of the segmented areas using the process management system. The process management system implements the heat press processing when apply the heat press processing to each of the intermediate resin sheets. The intermediate resin sheets correspond to the resin sheets subjected to the intermediate processing with processing conditions corrected for each of the individual areas. The processing conditions are corrected based on the shrinkage rate related information for each of the individual areas and for each of the segmented areas. The processing conditions are also corrected based on the heat press processing condition information, which is the processing condition information of the heat press processing for each of the individual areas and for each of the segmented areas.

Therefore, appropriately corrected heat press processing can be implemented for each of the individual areas based on the heat press processing condition information and the shrinkage rate related information for each of the individual areas and for each of the segmented areas. This can be done without making corrections to the heat press processing condition information for each of the individual areas and for each of the segmented areas, while further reducing complex processes. This makes it possible provide a heat press processing method for an intermediate resin sheet with the extruded resin sheet subjected to the intermediate processing to allow products to be manufactured with more stable accuracy.

According to another aspect of the present disclosure, the shrinkage rate related information contains at least one of: a temperature of each individual of the extruded resin sheet that was subjected to the extrusion molding, a temperature of a roller used for the extrusion molding, a rotation number of the roller, a sheet thickness distribution of each of the segmented areas, a temperature distribution of each of the segmented areas, and/or a refractive index distribution of each of the segmented areas. It is thus possible to obtain appropriate information to be used for the shrinkage rate related information.

According to another aspect of the present disclosure, the heat press processing condition information contains at least one of: a heating distribution for each of the segmented areas corresponding to the individual areas, and/or a pressure distribution for each of the segmented areas. It is thus possible to obtain appropriate information to be used for the heat press processing condition information.

BRIEF DESCRIPTION OF THE DRAWINGS

FIG. 5 is a diagram illustrating an example of shrinkage rate related information.

FIG. 6 is a diagram illustrating an example of heat press processing condition information.

FIG. 7 is a diagram illustrating an example of a target contour and contour information associated with a pre-shrinkage contour.

FIG. 10 is a diagram illustrating an example of coating thickness information, where the maximum allowable coating thickness is set in accordance with each of the segmented areas with various curvatures.

FIG. 11 is a cross-sectional view taken along line XI-XI in FIG. 8 illustrating an example where coatings with their thickness corresponding to each of the segmented areas is applied.

FIG. 18 is a view illustrating an example of final product inspection information acquired in the inspection process.

FIG. 20 is a diagram illustrating curvature/target curing degree characteristics where a target curing degree corresponding to the curvature of the resin sheet is set according to the second embodiment.

FIG. 21 is a diagram illustrating an example of curing degree information where the target curing degree corresponding to each of the segmented areas of various curvatures is set according to the second embodiment.

FIG. 22 is a diagram illustrating an example of curvature/target coating thickness characteristics where the target coating thickness corresponding to the curvature of the resin sheet is set according to the third embodiment.

FIG. 23 is a diagram illustrating an example of coating thickness information where the target coating thickness corresponding to each of the segmented areas of various curvatures is set according to the third embodiment.

DETAILED DESCRIPTION

Hereinafter, an embodiment for carrying out one embodiment of the present disclosure will be described with reference to the drawings. When an X-axis, Y-axis, or Z-axis are shown in the figures, a Z-axis direction refers to a vertically upward direction, an X-axis direction refers to an extruding direction (substantially horizontal direction) of an extruded resin sheet W, and a Y-axis direction refers to a substantially horizontal direction orthogonal to the X-axis direction. Hereinafter, a resin sheet manufacturing process, including an intermediate processing method of an extruded resin sheet, and a heat press processing method for an intermediate resin sheet of an extruded resin sheet subjected to intermediate processing according to a first to third embodiments will be described in order. In the first embodiment, a coating process P3 includes a coating curing process P3E (a process to completely cure a coating). In the second embodiment, the coating curing process P3E is replaced with a coating semi-curing process P3F (a process to semi-cure the coating), and a coating completely curing process P7 (a process to completely cure the coating) is added between a heat press process P6 and an inspection process P8.

First Embodiment (FIG. 1 to FIG. 18)

First, overview of the entire manufacturing process for manufacturing a resin sheet will be described with reference to FIG. 1. The resin sheet manufacturing process includes an extrusion molding process P1, a shrinkage prediction process P2, a coating process P3, a printing process P4, a trimming process P5, a heat press process P6, an inspection process P8, and the like. The manufacturing process is managed and controlled by a process management system 1. The process management system 1 includes a total management device 2 and includes a management device 10, 20, 30, 40, 50, 60, 80 for each process. Further, the total management device 2 and the management devices 10, 20, 30, 40, 50, 60, 80 for each process are connected to a communication line T, such that various information can be transmitted to and received from each of the components. In addition, the communication line T may be either wired or wireless, or may be part of a network or the internet. In case of using the internet, the extrusion molding process P1 to the trimming process P5, the heat press process P6, and the inspection process P8 can be conducted at separate remote locations.

The total management device 2 may be, for example, a personal computer, which is configured to start or stop each of the management devices 10 to 60, 80 for each process, to transmit and receive various types of information, etc. The total management device 2 may also be configured to centrally manage whether each process was conducted properly.

Figure 1:
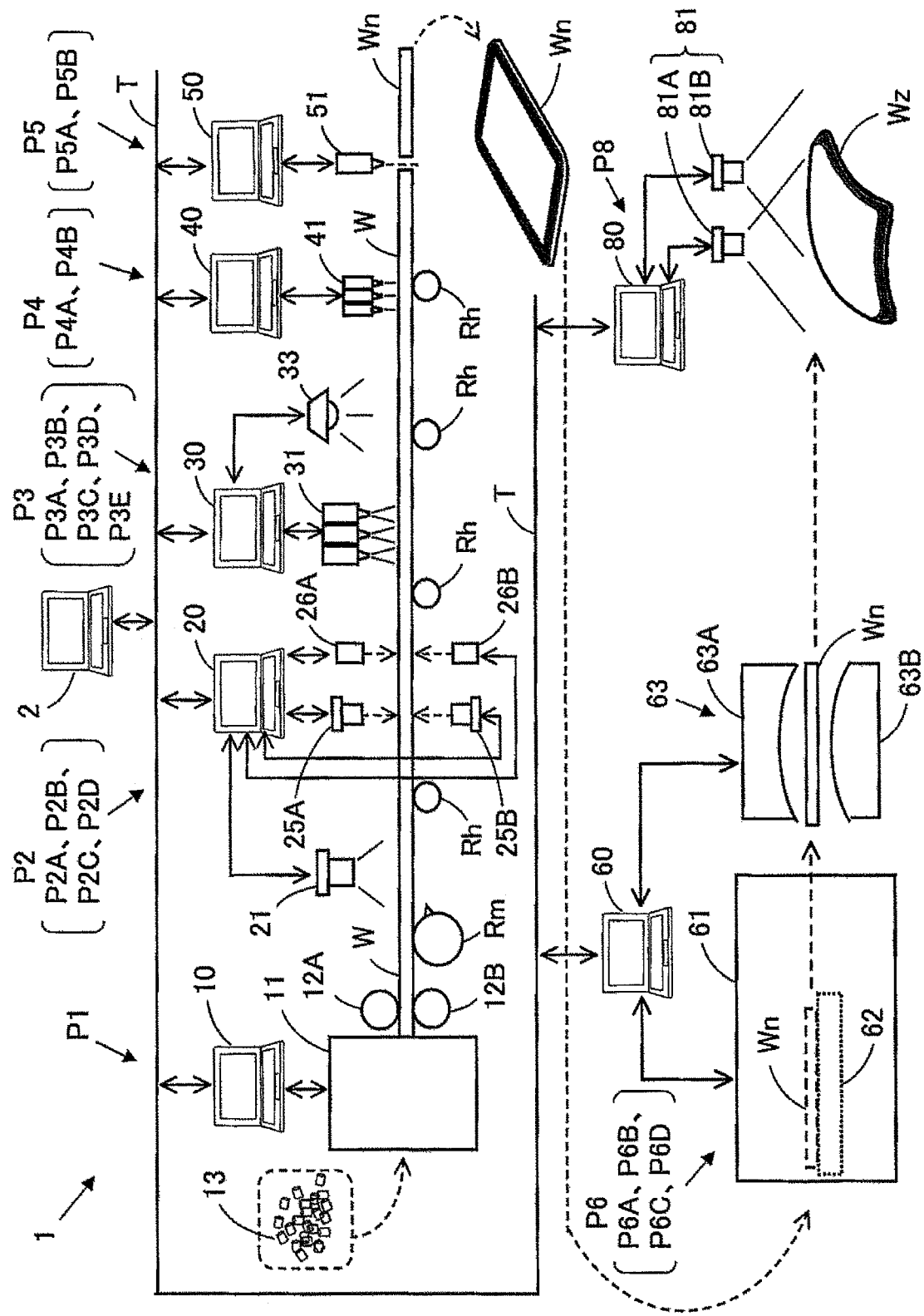
FIG. 1 is a view illustrating an entire manufacturing processes of a resin sheet according to a first embodiment.

As shown in FIG. 1, in the extrusion molding process P1, a strip-like extruded resin sheet W is extrusion molded from a resin material 13 using an extrusion molding device 11. The strip-like extrusion resin sheet W is cut out into individual intermediate resin sheet Wn (intermediate products) through the shrinkage prediction process P2, the coating process P3, the printing process P4, and the trimming process P5. The individual intermediate resin sheet Wn (intermediate products) is then finished into a final resin sheet Wz as a finished product (finished item) after completing the heat press processes P6 (heating implementing process P6B, pressing implementing process P6D). During the heat press processes P6, the intermediate resin sheet Wn (intermediate product) is heated in the heating implementing process P6B. Subsequently, the intermediate resin sheet Wn is pressed in the pressing implementing process P6D. During this time, various areas of the intermediate resin sheet Wn (intermediate product) shrink in various directions. This shrinkage could change when the lot of the resin material 13 changes. Even within the same lot, shrinkage varies from area to area of the extruded resin sheet W due to various factors, such as residual stress during extrusion. Therefore, it has been conventionally very difficult to stably ensure the accuracy of the final resin sheet Wz (finished item). However, it is possible to stably ensure the accuracy of the resin final sheet Wz (finished item) by adjusting the intermediate processing method of the extruded resin sheet and the heat press processing method of the intermediate resin sheet as described in the present embodiments.

Conventionally, intermediate resin sheets (intermediate product) were prepared to have a generous size to allow for shrinkage in the heat press processes. Subsequently, excessive portions would need to be cut off to finish the final rein sheet (finished item). That is, with the conventional method, a process to cut off the excessive portions is required. Also, it is necessary to keep the intermediate resin sheet fairly large in size since they are heat-pressed without knowing how they would shrink. As a result, large portions of the resin sheet needed to be cut off and wasted (larger portions of the coating and printing would also results in excessive waste). Further, since the intermediate resin sheet was heat-pressed without knowing how it would shrink, printing misalignment may possibly occur. However, according to the intermediate processing method of the extruded resin sheet and the heat pressing method of the processed intermediate resin sheet of the present disclosure, the process to cut off excessive portions after the heat press process is not necessary. As a result, it is possible to reduce an amount of waste of the resin sheet and to reduce an amount of unnecessary coating or printing, as well as reducing the occurrence of printing misalignment.

[Regarding "Intermediate Processing" and "Post-Processing"]

The strip-like extruded resin sheet W may be formed by heating and extruding a resin material. Hereinafter, embodiments of each of the processes for manufacturing an intermediate resin sheet Wn (intermediate product), which is a resin sheet to be used for the heat press processing, from the strip-like extruded resin sheet W will be described. Each of the processes includes an intermediate processing method of an extruded resin sheet W. The processes also include a heat press processing method for processing the intermediate resin sheet Wn (intermediate product). In the description of the present embodiment, the "intermediate processing" refers to the process after extrusion molding and before (immediately before, shortly before, etc.) the heat press processing. Also, in the description of the present embodiment, the "intermediate processing" is a processing after the shrinkage prediction process P2. For example, the intermediate processing includes processing by the coating process P3, the printing process P4, and the trimming process P5, but does not include the heat press process P6. In addition, in the description of the present embodiment, the "post-processing" is the processing after extrusion molding and includes the heat press processing. And in the description of the present embodiment, the "post-processing" is the processing after the shrinkage prediction process P2 and includes the coating process P3, the printing process P4, the trimming process P5, and the heat press process P6.

[Extrusion Molding Process P1 (FIG. 2)]

Figure 2:
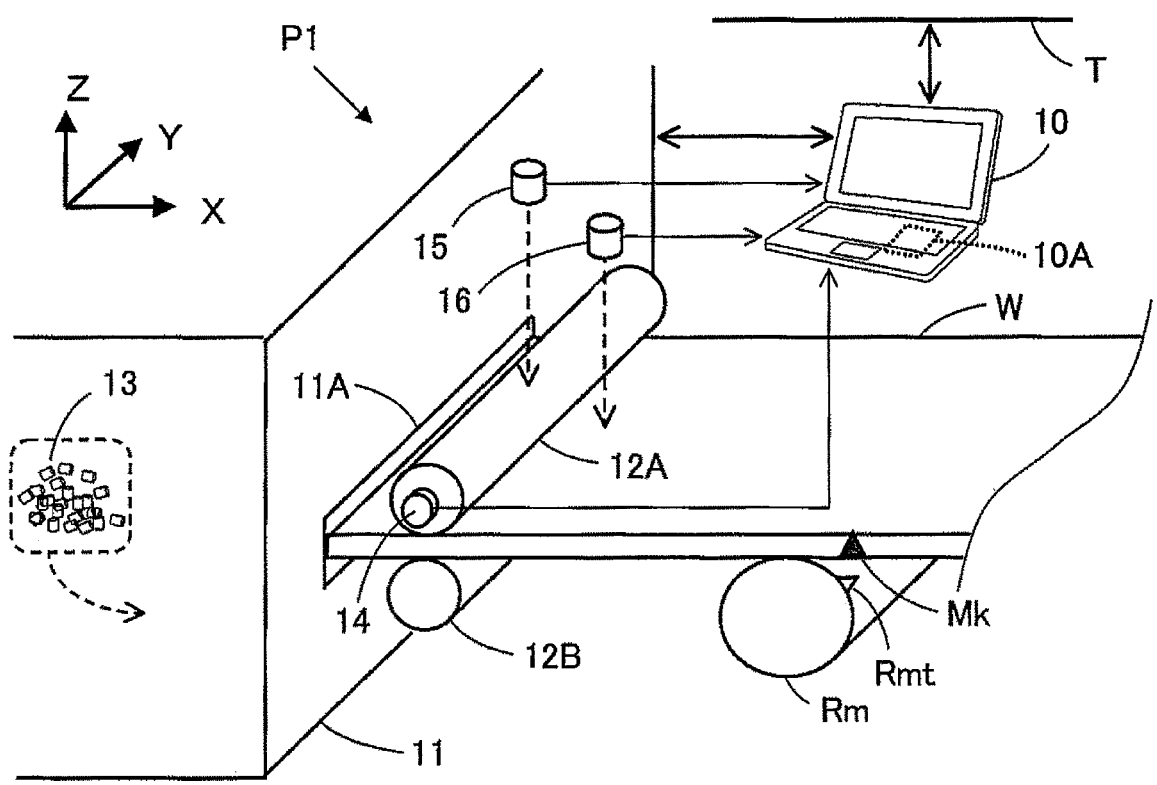
FIG. 2 is a perspective view illustrating an example of an extrusion molding process.

As shown in FIG. 2, the extrusion molding process P1 is implemented by an extrusion molding process management device 10 (e.g., personal computer), an extrusion molding device 11, etc. The extrusion molding process management device 10 allows the extrusion molding device 11 to operate in accordance with instruction from the total management device 2 (or input instruction from an operator(s)). A resin material 13, such as polycarbonate, is charged into the extrusion molding device 11, and the resin material 13 is heated until it reaches a predetermined temperature, for instance a temperature at which it becomes melted. The melted resin material 13 is discharged from a resin sheet discharge port 11A under a predetermined pressure to form a strip-like extruded resin sheet W, which is intended to have a constant width and a constant thickness. The strip-like extruded resin sheet W discharged from the resin sheet discharge port 11A is made to have a constant thickness by extrusion molding rollers 12A, 12B, and is conveyed at a constant speed.

A marking conveyor roller Rm engraves a small mark Mk on an edge of the extruded resin sheet every one rotation. The mark Mk is used as a boundary of individual areas for a virtually segmenting process, as will be described later. However, if boundaries for the individual areas can be set without providing the mark Mk, the engraving of the mark Mk may be omitted.

An extrusion molding roller 12A (or extrusion molding roller 12B) is provided with a rotation detecting means 14 (e.g., rotation sensor) configured to output detected signals corresponding to the rotation of the extrusion molding roller 12A. An extrusion molding process management device 10 is capable of detecting the rotation speed (rotation number) of the extrusion molding roller 12A based on the detected signals from the rotation detecting means 14.

An extrusion molding device 11 is provided with a roller temperature detecting means 15 (e.g., non-contact temperature sensor) configured to output detected signals corresponding to the temperature of the extrusion molding roller 12A. The extrusion molding device 11 is also provided with an extruded resin sheet temperature detecting means 16 (e.g., non-contact temperature sensor) configured to output detected signals corresponding to detected temperature of the extruded resin sheet W. The extrusion molding process management device 10 is capable of detecting the temperature of a roller surface of the extrusion molding roller 12A based on the detected signals from the roller temperature detecting means 15. The extrusion molding process management device 10 is capable of detecting the temperature of the corresponding area of the extruded resin sheet W based on the detected signals from the extrusion resin sheet temperature detecting means 16. The rotation speed of the extrusion molding roller 12A, the temperature of the extrusion molding roller 12A, and the temperature of the extruded resin sheet W are used in a contour calculating process P2C, an embodiment of which will be described later.

The extrusion molding process management device 10 is configured to measure the roller rotation number, the roller temperature, and the resin sheet temperature and to determine positions of the extruded resin sheet W, for example from a front end (corresponding to individual areas W1, W2 . . . , which will be described later) corresponding to these measurements. The extrusion molding process management device 10 is also configured to transmit these measurements/correspondences via the communication line T to a shrinkage prediction process management device 20. For example, the diameters of the extrusion molding rollers 12A, 12B may be about 500 to 600 millimeters [mm], and the thickness of the extruded resin sheet W may slightly vary for every one rotation.

[Shrinkage Prediction Process P2 (Virtually Segmenting Process P2A, Shrinkage Rate Related Information Acquiring Process P2B, Contour Calculating Process P2C, and Contour Storing Process P2D) (FIG. 3 to FIG. 7)]

Hereinafter, a shrinkage prediction process P2 (which may include a virtually segmenting process P2A, a shrinkage rate related information acquiring process P2B, contour calculating process P2C, and contour storing process P2D) will be described with reference to FIG. 3 to FIG. 7. In the shrinkage prediction process P2, it is predicted how the final resin sheet Wz (finished item) will shrink when the final resin sheet Wz (finished item) is manufactured from the extruded resin sheet W, as shown in FIG. 1. As described above, it is difficult to predict the shrinkage rate of the entire area corresponding to the final resin sheet Wz (finished item), even if the extruded resin sheet W is a strip-like continuous sheet from the same lot. This difficulty is partly due to the fact that the shrinkage rate may be different at different positions. Therefore, in this embodiment, the area corresponding to the final resin sheet Wz (finished item) is segmented into small segmented areas for recognition. The shrinkage states may be predicted for each of the individual areas. When the area is small, the shrinkage state of the area can be predicted. And, for each area and each of the segmented areas are then integrated to predict the shrinkage state of the entire area corresponding to the final resin sheet Wz (finished item). The shrinkage prediction process P2 is implemented before the intermediate processing (in this case, coating, printing, and trimming) and before heat pressing (i.e., post-processing). The shrinkage prediction process P2 is implemented by the shrinkage prediction process management device 20.

The shrinkage prediction process P2 includes a virtually segmenting process P2A, a shrinkage rate related information acquiring process P2B, a contour calculating process P2C, a contour storing process P2D, and the like. These processes will be described in detail below.

[Virtually Segmenting Process P2A (FIG. 3 and FIG. 4)]

Figure 3:
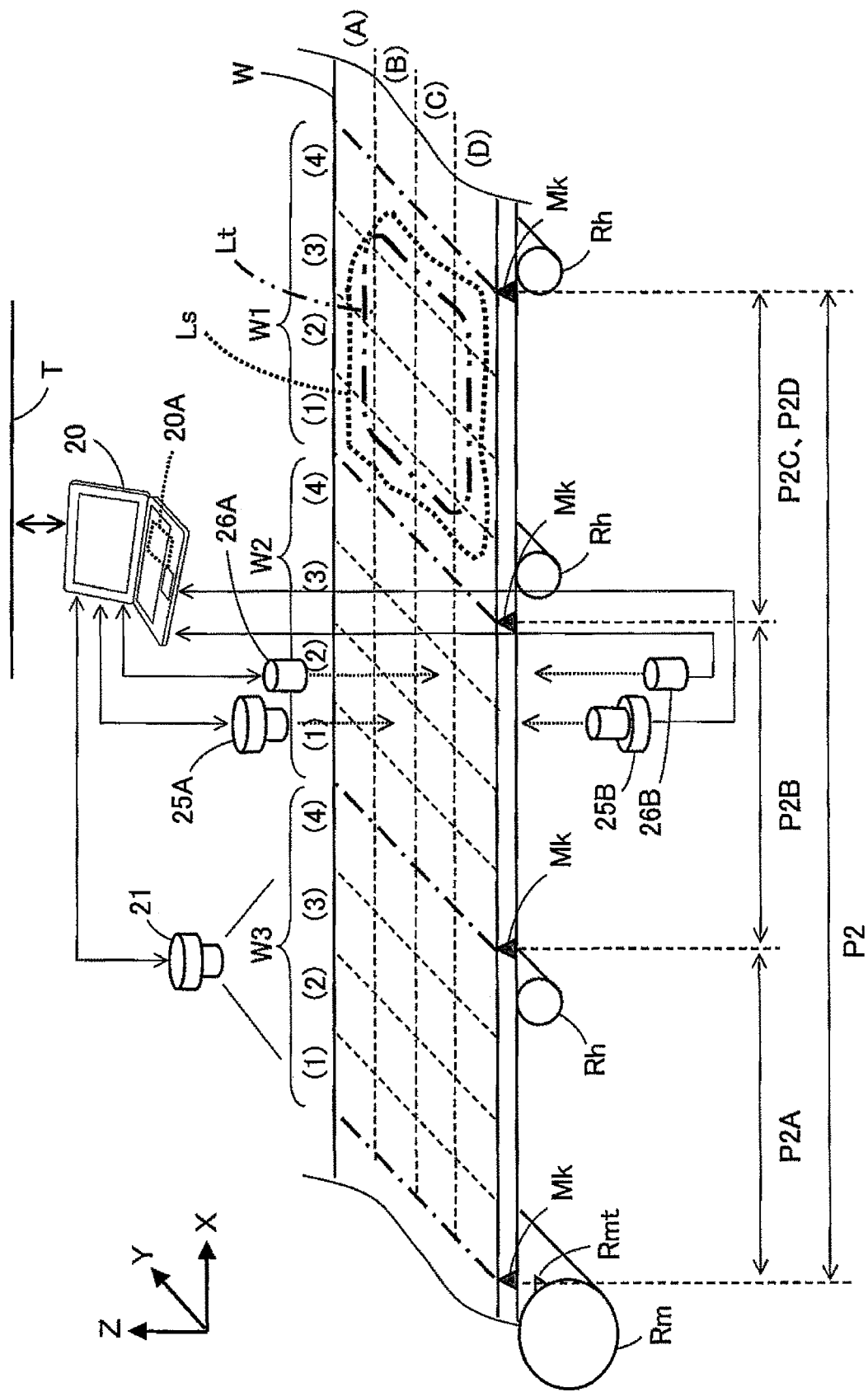
FIG. 3 is a perspective view illustrating an example of a virtually segmenting process, a shrinkage rate related information acquiring process, a contour calculating process, and a contour storing process.

As shown in FIG. 3, the virtually segmenting process P2A is implemented by the shrinkage prediction process management device 20 (e.g., personal computer) and an area image capturing device 21 (e.g., camera). The virtually segmenting process P2A is implemented before implementing the intermediate processing and before implementing the heat press processing (i.e., post-processing). As described above, marks Mk are engraved at constant intervals in an edge of the extruded resin sheet W while it is being conveyed at a constant speed by the marking conveyor roller Rm. The shrinkage prediction process management device 20 virtually segments the strip-like continuous extruded resin sheet W into individual areas W1, W2, W3, etc. This may be done based on the information received from the area image capturing device 21 and in accordance with the instruction from the total management device 2 (or input instruction from an operator etc.). The individual areas W1, W2, W3, etc. correspond to a separate final resin sheet Wz (finished item) (see FIG. 1). The final resin sheet Wz will be cut out from the extruded resin sheet W. Specifically, the individual areas W1, W2, W3, etc. are slightly wider than the resin sheet Wz (finished item). In the examples shown in FIG. 3 and FIG. 4, the resin sheet is virtually segmented into the individual areas W1, W2, W3, which are positions (positions at marks Mk) indicated by dashed-and-dotted lines.

Figure 4:
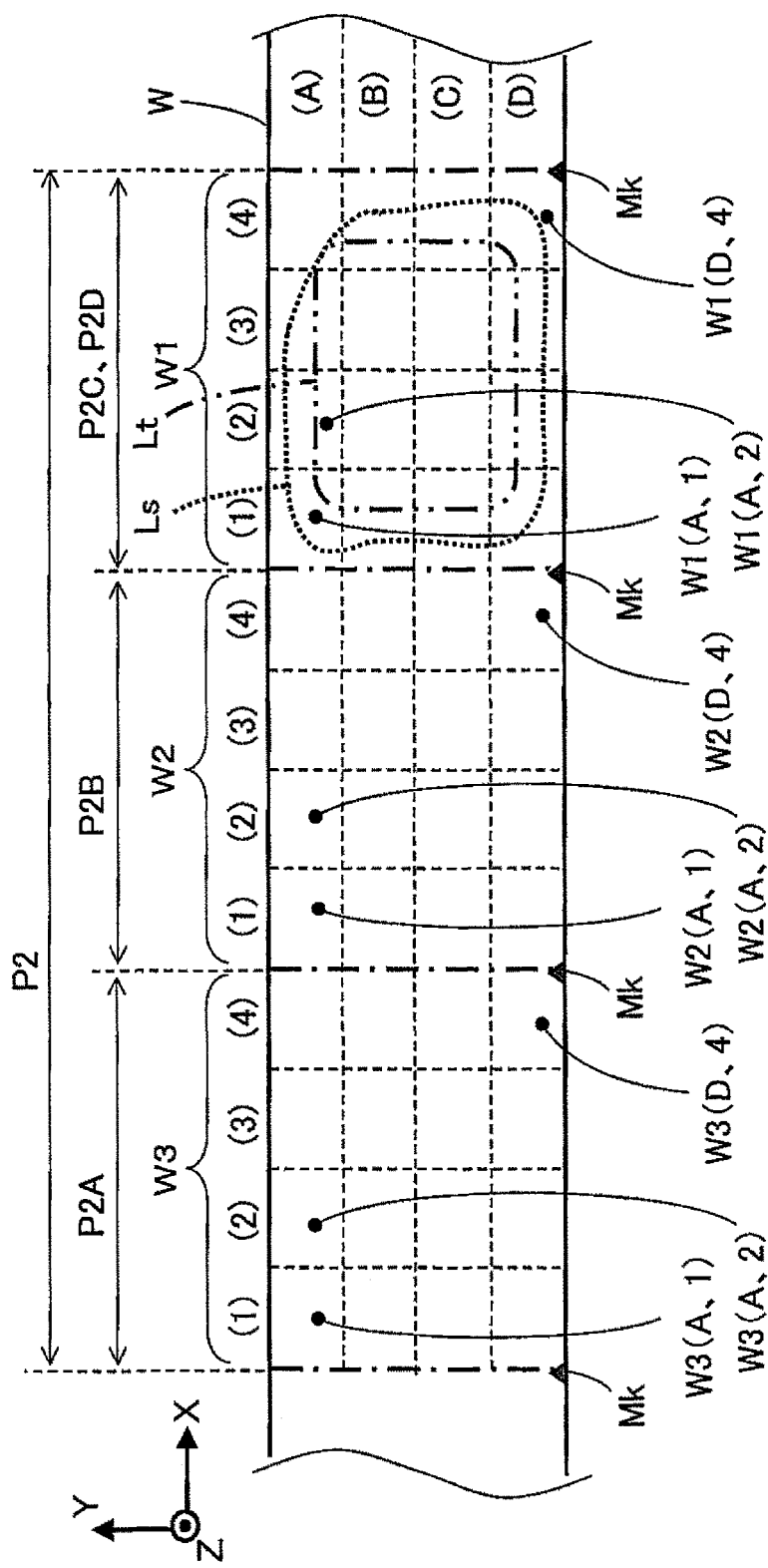
FIG. 4 is a plan view of FIG. 3 illustrating an example of individual areas, segmented areas, a target contour, and a pre-shrinkage contour.

The shrinkage prediction process management device 20 then virtually segments each of the individual areas W1, W2, W3 into a plurality of further segmented areas, as indicated by dotted lines in FIG. 3 and FIG. 4. In the examples shown in FIG. 3 and FIG. 4, the individual areas W1, W2, W3 are, for example, segmented into 16 segmented areas, such as W1 (A, 1), W1 (A, 2) . . . W1 (D, 4). The length×width size of each of the segmented areas is, for example, about several 10's of millimeters [mm]×several 10's of millimeters [mm]. Since the shrinkage prediction process management device 20 segments both the individual areas and segmented areas virtually; the extruded resin sheet W is not actually marked with lines or the like.

[Shrinkage Rate Related Information Acquiring Process P2B (FIG. 3 to FIG. 5)]

As shown in FIG. 3, the shrinkage rate related information acquiring process P2B is implemented by the shrinkage prediction process management device 20 and the shrinkage rate related information measuring devices 25A, 25B, 26A, 26B, etc. The shrinkage rate related information acquiring process P2B is implemented before implementing the intermediate processing and the heat press processing (i.e., post-processing). The shrinkage rate related information measuring devices 25A, 25B, 26A, 26B may be, for example, a sheet thickness distribution measuring device, which is used for measuring the sheet thickness, a temperature distribution measuring device, which is used for measuring the temperature of the sheet, a refractive index distribution measuring device, which is used for measuring the refractive index, or the like. The shrinkage prediction process management device 20 predicts the shrinkage rate of each virtually segmented area. This may be done by acquiring the shrinkage rate related information of each virtually segmented area using the shrinkage rate related information measuring device(s). The shrinkage rate related information is then stored in a storage device.

For example, as shown in FIG. 5, the shrinkage prediction process management device 20 stores the shrinkage rate related information for each of the individual areas W1, W2, W3. In the example shown in FIG. 5, a roller temperature TRw1, a roller rotation number RRw1, and a sheet temperature TSw1 (these information are received from the extrusion molding process management device 10 of the extrusion molding process P1 via the communication line T) are stored in the shrinkage rate related information corresponding to each of the individual areas W1, W2, W3. The shrinkage prediction process management device 20 receives the roller temperature, the roller rotation number, the sheet temperature, etc. corresponding to the individual areas from the extrusion molding process management device 10, and stores them so as to correspond to the individual areas. Further, the sheet thickness distribution, the temperature distribution, and the refractive index distribution for each of the (segmented) areas (A, 1), (A, 2) . . . (D, 4) are stored in the shrinkage rate related information corresponding to each of the individual areas W1, W2, W3, as shown in FIG. 5.

[Contour Calculating Process P2C, Contour Storing Process P2D (FIG. 3 to FIG. 7)]

As shown in FIG. 3, the contour calculating process P2C and the contour storing process P2D are implemented by the shrinkage prediction process management device 20. These processes are implemented before implementing the intermediate processing and the heat press processing (i.e., post-processing). In the contour calculating process P2C, the shrinkage prediction process management device 20 receives the heat press processing condition information, which is processing condition information of the post-processing related to the shrinkage (in this case, heat pressing), from the heat press process management device 60. This information is then stored. FIG. 6 show an example of the heat press processing condition information. The example of FIG. 6 shows an example of which processing conditions are expected when heat pressing the individual areas W1, W2, W3. The processing conditions may be individually set for each of the individual areas and for each of the segmented areas. The heating distribution (heating temperature distribution, amount of temperature applied) when heating and the pressure distribution (amount of pressure applied) when pressing are set as the heat press processing condition information so as to correspond to each of the (segmented) areas (A, 1), (A, 2) . . . (D, 4) of the individual areas W1, W2, W3.

Subsequently, the shrinkage prediction process management device 20 virtually sets a target contour Lt (see FIG. 3 and FIG. 4) for each of the individual areas W1, W2, W3. The target contour Lt is a contour of the final resin sheet Wz (finished item) after the intermediate processing and the heat press processing (i.e., post-processing) have been completed. The example of FIG. 3 and FIG. 4 show an example in which the shrinkage prediction process management device 20 virtually sets the target contour Lt for the individual areas W1, W2, W3 in the contour calculating process P2C.

Subsequently, the shrinkage prediction process management device 20 calculates (predicts) and virtually sets a pre-shrinkage contour Ls, which is a contour of the sheet before it shrinks to the target contour Lt. This calculation may be done for each of the individual areas based on the shrinkage rate related information of each of the individual areas and of each of the segmented areas (see FIG. 5). The calculation may also be based on the heat press processing condition information (see FIG. 6) for each of the individual areas and for each of the segmented areas. The example of FIG. 3 and FIG. 4 is an example showing that the shrinkage prediction process management device 20 calculates and virtually sets the pre-shrinkage contour Ls corresponding to the target contour Lt with respect to the individual area W1 in the contour calculating process P2C.

Further, the shrinkage prediction process management device 20 allows the information for the virtually set target contour Lt and the virtually set pre-shrinkage contour Ls as they correspond to the individual areas as contour information, which is shown in FIG. 7. This information is stored in the storage device in the contour storing process P2D (in this example, the contour is decomposed into multiple position coordinates (a, b) and stored).

[Coating Process P3 (Correction Amount Acquiring Process P3A, Curvature Related Information Acquiring Process P3B, Coating Condition Per Area Setting Process P3C, Coating Implementing Process P3D, Coating Curing Process P3E) (FIG. 8 to FIG. 11)]

Figure 8:
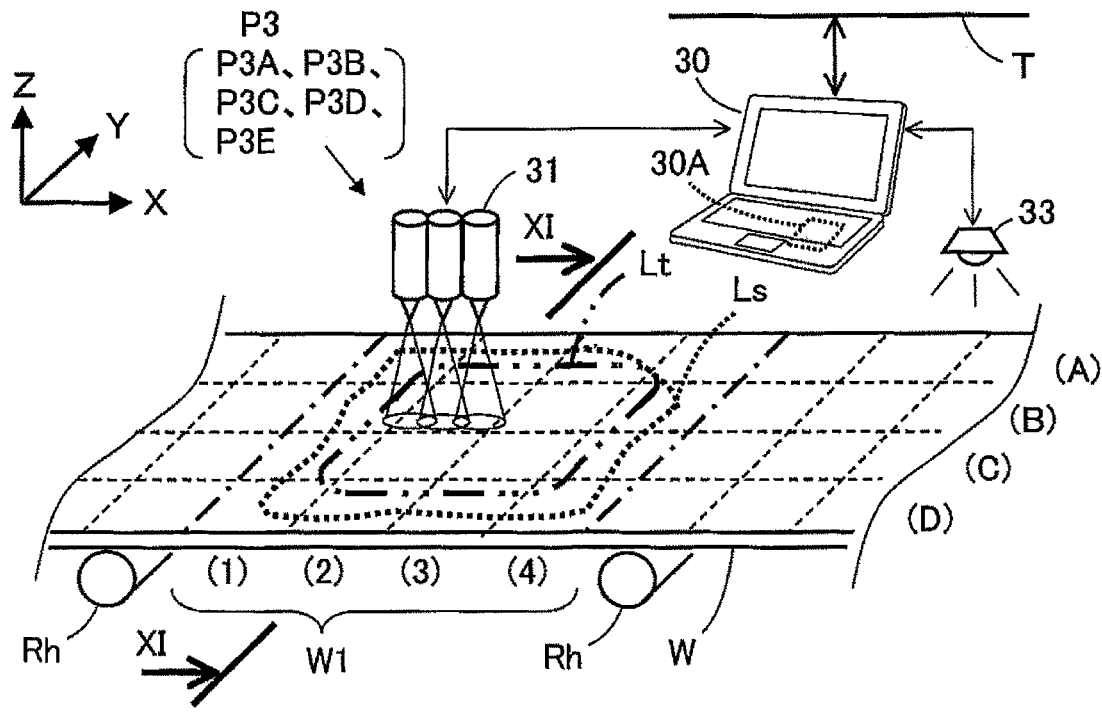
FIG. 8 is a perspective view illustrating an example of a coating process.
Figure 9:
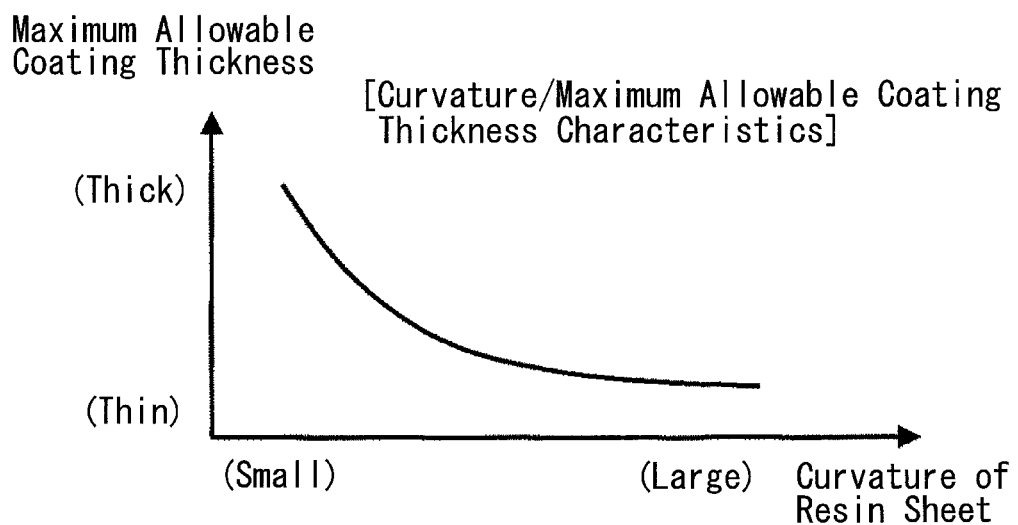
FIG. 9 is a diagram illustrating an example of curvature/maximum allowable coating thickness characteristics, where the maximum allowable coating thickness is set to correspond to a curvature of a resin sheet.

As shown in FIG. 8, the coating process P3 may be implemented by a coating process management device 30 (e.g., personal computer), a coating device 31, a curing device 33, etc. The coating process management device 30 allows the coating device 31 and the curing device 33 to operate in accordance with an instruction from the total management device 2 (or input instruction from an operator, etc.). The coating device 31 applies the coating agent, for example by using an ink jet method, so as to form a coating layer having a certain thickness (e.g., about 10 to 20 micrometers [μm]) on a surface or surfaces of the extruded resin sheet W (upper surface, or upper surface and lower surface). The curing device 33 is a device that irradiates ultraviolet rays, for example, if the coating agent is an ultraviolet curing type paint.

The coating process P3 includes a correction amount acquiring process P3A, a curvature related information acquiring process P3B, a coating condition per area setting process P3C, a coating implementing process P3D, a coating curing process P3E, etc. These will be described in detail below. The coating process P3 is one of the intermediate processing process (and may also be one of the post-processing processes). The coating implementing process P3D included in the coating process P3 of this embodiment is one of the intermediate processing implementing process.

[Correction Amount Acquiring Process P3A]

The coating process management device 30 determines a correction amount of the coating for each of the individual areas. The correction amount acquiring process P3A is implemented before the coating implementing process P3D. Specifically, the coating process management device 30 sets a range of the pre-shrinkage contour for each of the individual areas corresponding to a range to be subjected to the coating for each of the individual areas. In this case, the coating process management device 30 sets the coating range of the individual area W1 to the range of the pre-shrinkage contour Ls associated with the individual area W1 (see FIG. 3 and FIG. 4).

[Curvature Related Information Acquiring Process P3B (FIG. 10)]

The final resin sheet Wz (finished item), which is formed after completing the heat press process P6 (see FIG. 1), is formed into a curved shape, with each area curved with a respective curvature, by heat pressing. It is preferable that the coating layer applied on the surface of the resin sheets be thick. However, if it is too thick, cracks, such as breakages or crazes, may occur when the curvature forming rate during heat press forming is large. Therefore, it is desired to apply a coating as thick as possible, while also reducing the possibility of causing cracks, such as breakages or crazes.

Coating thickness information, an example of which is shown in FIG. 10, are stored in a storage device 30A of the coating process management device 30. The maximum curvature when shrunk to the target contour Lt (FIG. 3 and FIG. 4) and the maximum allowable coating thickness corresponding to the maximum curvature are set as coating thickness information for each of the (segmented) areas of the individual areas. The maximum allowable coating thickness for each of the (segmented) areas in the coating thickness information is determined by the maximum curvature of the (segmented) area (when shrunk to the target contour Lt) and by the curvature/maximum allowable coating thickness characteristics (see FIG. 9).

The coating process management device 30 acquires the maximum curvature from the heat press process management device 60 (see FIG. 1) used for managing the heat press process P6 via the communication line T. The coating process management device 30 then stores the "maximum curvature" of the coating thickness information (see FIG. 10) for each (segmented) area. In this case, the maximum curvature is the maximum curvature when shrunk to the target contour Lt. The maximum curvature is also one of the curvature related information relating to the curvature after the heat press process P6 is implemented.

[Coating Condition Per Area Setting Process P3C (FIG. 9 and FIG. 10)]

In the first embodiment, the coating process management device 30 sets a "coating thickness" for each of the individual areas and for each of the segmented areas in accordance with the curvature based on the curvature related information for each of the individual areas and for each of the segmented areas. This is done in the coating condition per area setting process P3C. That is, the "coating condition per area" in the first embodiment is a "coating thickness for each of the individual areas and for each of the segmented areas".

The curvature/maximum allowable coating thickness characteristics (see FIG. 9), in which the maximum allowable coating thickness is set based on the curvature of the resin sheet, is stored in the storage device 30A of the coating process management device 30. The coating process management device 30 determines the maximum allowable coating thickness of each (segmented) area based on the maximum curvature of that (segmented) area and based on the curvature/maximum allowable coating thickness characteristics. This is done for each of the (segmented) area associated with the individual area W1 of the resin sheet. The maximum curvature is the maximum curvature of the resin sheet based on the curvature related information. The coating process management device 30 then stores (sets) the determined maximum allowable coating thickness for each area as the "maximum allowable coating thickness" of the coating thickness information (see FIG. 10). The determined maximum allowable coating thickness is a thickness thinner than or equal to the maximum allowable coating thickness. In the first embodiment, in the segmented areas that have a greater curvature, the maximum allowable coating thickness is set such that the coating thickness is thinner than that in the segmented areas with a smaller curvature.

In the heat press process P6 shown in FIG. 1, the intermediate resin sheet Wn (intermediate product) shrinks. Taking this shrinkage into account, the "maximum curvature" when shrunk to the target contour Lt and the "maximum allowable coating thickness" corresponding to the maximum curvature are set as the said coating thickness information (see FIG. 10) for each of the individual areas and for each of the segmented areas. The shrinkage rate of the intermediate resin sheet Wn (intermediate product) may be, for example, about 1 to 5%. In this case, it is assumed that there is almost no shrinkage due to the heat press process P6. That is, it is assumed that the intermediate resin sheet Wn (intermediate product) has already been shaped into the final resin sheet Wz (finished item) with almost no shrinkage. In this case, the "maximum curvature" and the "maximum allowable coating thickness" for each of the individual areas and for each of the segmented areas having the target contour Lt may be stored (set) as the coating thickness information (see FIG. 10).

[Coating Implementing Process P3D]

As shown in FIG. 8, in the coating implementing process P3D, the coating process management device 30 controls the coating device 31 to apply the coating only in the range of the pre-shrinkage contour Ls (see FIG. 3 and FIG. 4). Therefore, since the coating is not applied to an unnecessarily large range, a waste of the coating agent, a waste of time for applying the coating within unnecessary range, and the like can be eliminated. In this way, a coating (both in the intermediate processing and post-processing), which has been corrected for each of the individual areas, is implemented using the pre-shrinkage contour based on the shrinkage rate related information and based on the heat press processing condition information for each of the individual areas and for each of the segmented areas.

The coating process management device 30 of FIG. 8 applies a coating (see FIG. 11) with a coating thickness set for each of the (segmented) areas based on the coating thickness information (see FIG. 10). The final resin sheet Wz (finished item) may be spherical or cylindrical, in which the entire curvature may be substantially constant. In this case, the coating thickness may be set for each of the individual areas without setting the coating thickness for each of the segmented areas of the corresponding individual area.

[Coating Curing Process P3E]

In the coating curing process P3E, the coating process management device 30 controls a curing device 33. The curing device 33 irradiates ultraviolet rays to cure the coating applied to each segmented area during the coating implementing process P3D. This may be done so that the coating is completely cured, which is a cured state in which the curing has almost been completed.

[Printing Process P4 (Correction Amount Acquiring Process P4A, Print Implementing Process P4B) (FIG. 12 to FIG. 14)]

Figure 12:
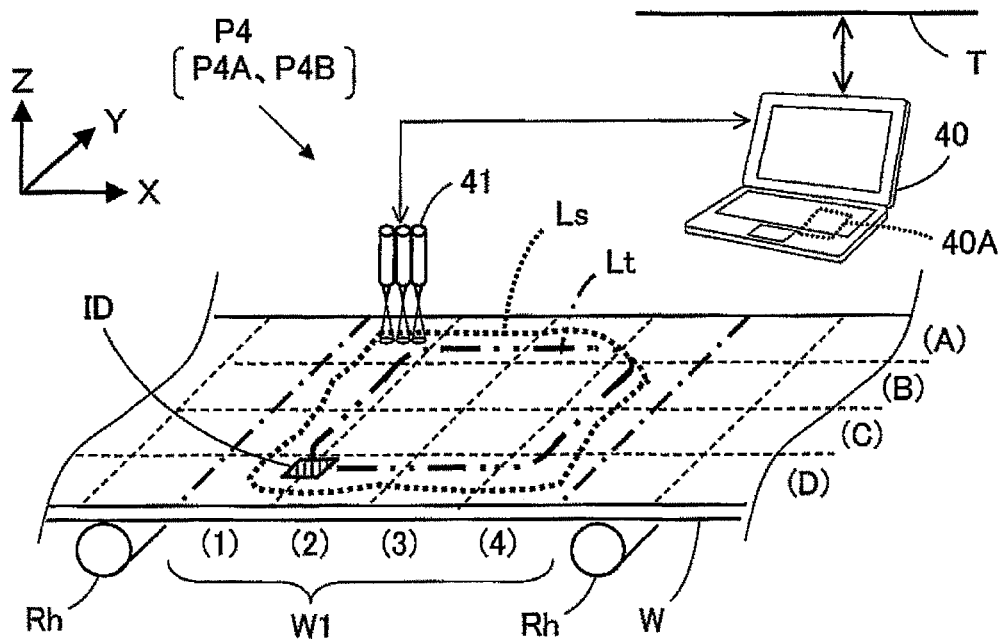
FIG. 12 is a perspective view illustrating an example of a printing process.

As shown in FIG. 12, the printing process P4 is implemented by a printing process management device 40 (e.g., personal computer), a printing device 41, etc. The printing process management device 40 allows the printing device 41 to operate in accordance with instructions from the total management device 2 (or input instruction from an operator, etc.). The printing device 41 applies the paint, for example using an ink jet method, so as to form a print layer on a surface or surfaces of the extruded resin sheet W (upper surface, or upper surface and lower surface).

The printing process P4 includes a correction amount acquiring process P4A, a print implementing process P4B, etc. These will be described in detail below. The printing process P4 is one of the intermediate processing processes (or one of the post-processing processes). In this embodiment, the print implementing process P4B of the printing process P4 is one of the intermediate processing implementing processes.

[Correction Amount Acquiring Process P4A]

The printing process managing device 40 determines a correction amount using the correction amount acquiring process P4A, which is done prior to the print implementing process P4B. Specifically, the printing process management device 40 determines the range, a shape and a scale to be printed for each of the individual areas based on the pre-shrinkage contour Ls corresponding to the individual areas, the target contour Lt, the shrinkage rate related information for each of the individual areas and for each of the segmented areas, as well as the heat press processing condition information for each of the individual areas and for each of the segmented areas. This is done to determine the correction amount for each (segmented) area that is to be printed.

Figure 13:
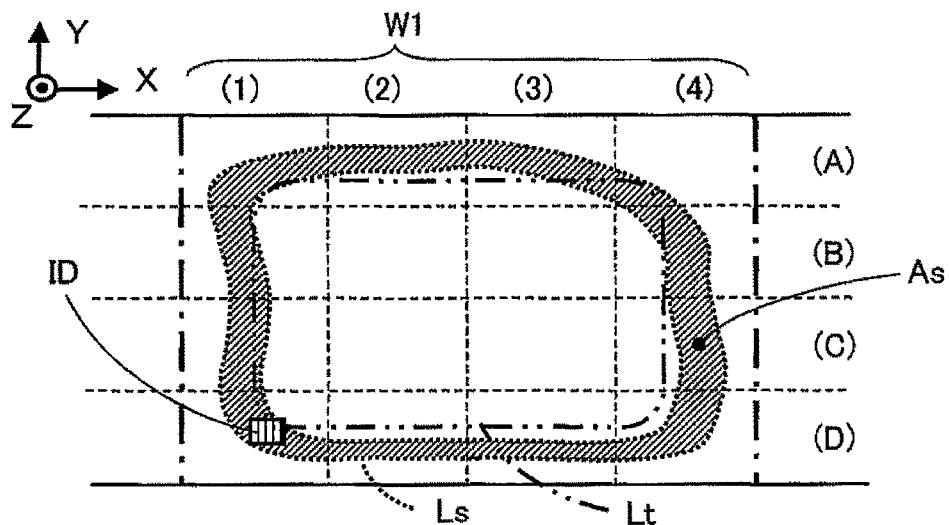
FIG. 13 is a view illustrating an example in which printing is applied on an edge of the pre-shrinkage contour while taking shrinkage into account.
Figure 14:
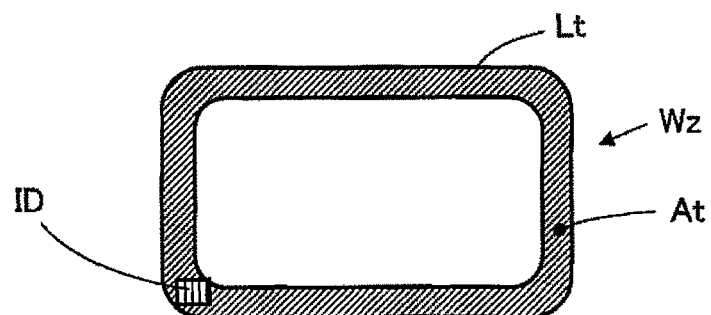
FIG. 14 is a view illustrating an example of a printed condition of an edge of a final product, after having been shrunk after the heat press process has been completed.

For example, a print area At of the final resin sheet Wz (finished item) (the area indicated by hatching in FIG. 14) may have a consistent width along an edge of the final resin sheet Wz (finished item), as shown in FIG. 14. In this case, the printing process management device 40 determines a printing area As, which is indicated by hatching in FIG. 13. As shown in FIG. 13, the individual area W1 may have a target contour Lt and a pre-shrinkage contour Ls. In this case, the printing process management device 40 estimates a shrinking direction and a shrinkage amount of each segmented area based on the target contour Lt, the pre-shrinkage contour Ls, the shrinkage rate related information for each of the individual areas and for each of the segmented areas (see FIG. 5), and the heat press processing condition information for each of the individual areas and for each of the segmented areas (see FIG. 6). This is done to determine a printing area As for each of the individual areas.

[Print Implementing Process P4B]

In the print implementing process P4B, the printing process management device 40 controls the printing device 41 to print the print area As (see FIG. 13). Therefore, since an unnecessary portion is not printed, it is possible to reduce a waste of paint and a waste of time that would be needed to print an excessively large range. Additionally, it is possible to reduce misalignment or distortion of the print area when finished. As described above, printing corrected for each of the individual areas (whether printing is done as intermediate processing or post-processing) is performed based on the shrinkage rate related information for each of the individual areas and for each of the segmented areas, the heat press processing condition information for each of the individual areas and for each of the segmented areas, the pre-shrinkage contour Ls, and the target contour Lt.

In the printing process P4, identification information ID corresponding to the individual area W1 may be printed on an edge within the pre-shrinkage contour Ls. This may be printed in the form of a two-dimensional code, bar code, etc. The identification information ID in the example of the present embodiment is "YMD-0001". The identification information is assigned during the shrinkage prediction process P2 and used in the coating process P3, the print process P4, the trimming process P5, the heat press process P6, and the inspection process P8. This identification information ID is used to identify each individual area. For example, the identification information ID may be used to identify the intermediate resin sheet Wn and the final resin sheet Wz (finished item). For example, each of the management devices (10, 20, 30, 40, 50) specify parameters for each of the individual areas W1, W2, W3, etc. in accordance with their location relative to the front end of the extruded resin sheet W. This is done until the intermediate resin sheet Wn (intermediate product) is cut out from the extruded resin sheet W during the trimming process P5. After the intermediate resin sheet Wn (intermediate product) has been cut out from the extruded resin sheet W in the trimming process P5, each of the management devices (60, 80) reads the identification information ID using a code reader, etc. This is used to specify which intermediate resin sheet Wn (intermediate product) of the cut out sheets corresponds to the desired individual area W1, etc.

[Trimming Process P5 (Correction Amount Acquiring Process P5A, Trimming Implementing Process P5B) (FIG. 15 and FIG. 16)]

Figure 15:
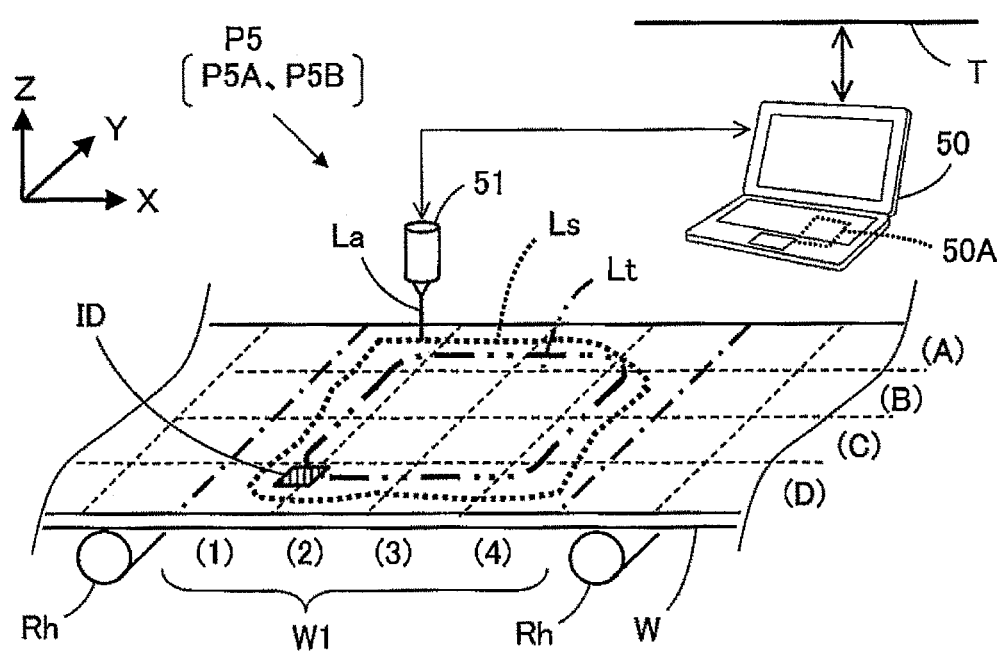
FIG. 15 is a perspective view illustrating an example of a trimming process.
Figure 16:
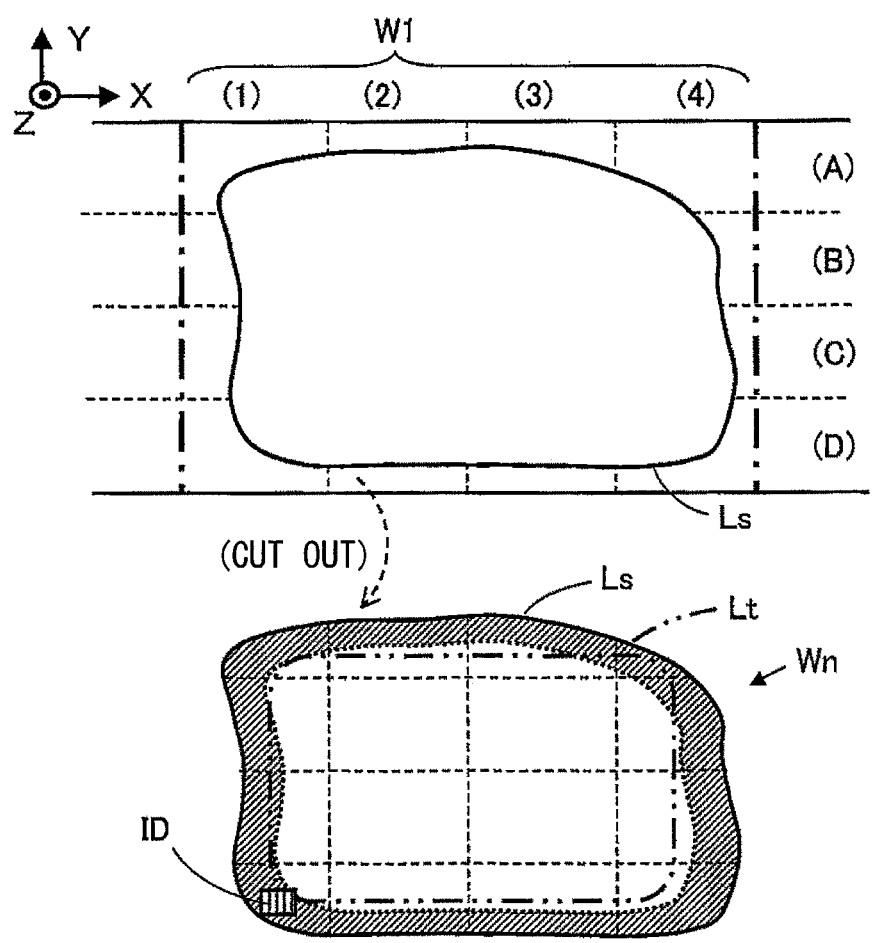
FIG. 16 is a view illustrating an example of a cut-out resin sheet with a pre-shrinkage contour during the trimming process.

As shown in FIG. 15, the trimming process P5 is implemented by the trimming management device 50 (e.g., personal computer), a trimming device 51, etc. The trimming process management device 50 allows the trimming device 51 to operate in accordance with instructions (or input instruction from an operator, etc.) from the total management device 2. The trimming device 51 may be, for example, a laser cutter that irradiates a laser beam La to cut out the intermediate resin sheet Wn (intermediate product) from the extruded resin sheet W (see FIG. 1 and FIG. 16).

The trimming process P5 includes a correction amount acquiring process P5A, a trimming implementing process P5B, etc. These will be described in detail below. The trimming process P is one of the intermediate processing processes (and may also be one of the post-processing processes). In this embodiment, the trimming implementing process P5B included in the trimming process P5 is one of the intermediate processing implementing processes.

[Correction Amount Acquiring Process P5A]

The trimming process management device 50 sets a range to be cut out from the individual area for each of the individual areas. This is done by implementing the correction amount acquiring process P5A prior to the trimming implementing process P5B. The trimming range may be set to a range of the pre-shrinkage contour Ls corresponding to the individual area to determine the correction amount of each of the individual areas when trimming.

[Trimming Implementing Process P5B]

In the trimming implementing process P5B, the trimming process management device 50 controls the trimming device 51 to cut out the range of the pre-shrinkage contour Ls from the individual area. Therefore, no wasted area is left (in the final resin sheet Wz (finished item), this cut out pre-shrinkage contour Ls shrinks to the target contour Lt). As described-above, the trimming area (the area that is trimmed as intermediate processing or post-processing) is corrected for each of the individual areas. The correction is performed using the pre-shrinkage contour based on the shrinkage related information for each of the individual areas and for each of the segmented areas, as well as being based on the heat press processing condition information for each of the individual areas and for each of the segmented areas.

When the trimming process P5 has been completed, the strip-like extruded resin sheet W is separated into the individual intermediate resin sheets Wn (intermediate product). Therefore, subsequent processes (e.g., a heat press process P6, an inspection process P8) may be performed in the same factory as where the processes up to and including the trimming process P5 have been performed, or the intermediate resin sheets Wn (intermediate products) may be transported to a factory at a remote location to conduct the subsequent processes. When the heat press process P6 and the inspection process P8 are performed at separate locations, for example, the total management device 2, the heat press process management device 60, the inspection process management device 80 may be connected to the internet.

[Heat Press Process P6 (FIG. 17)]

Figure 17:
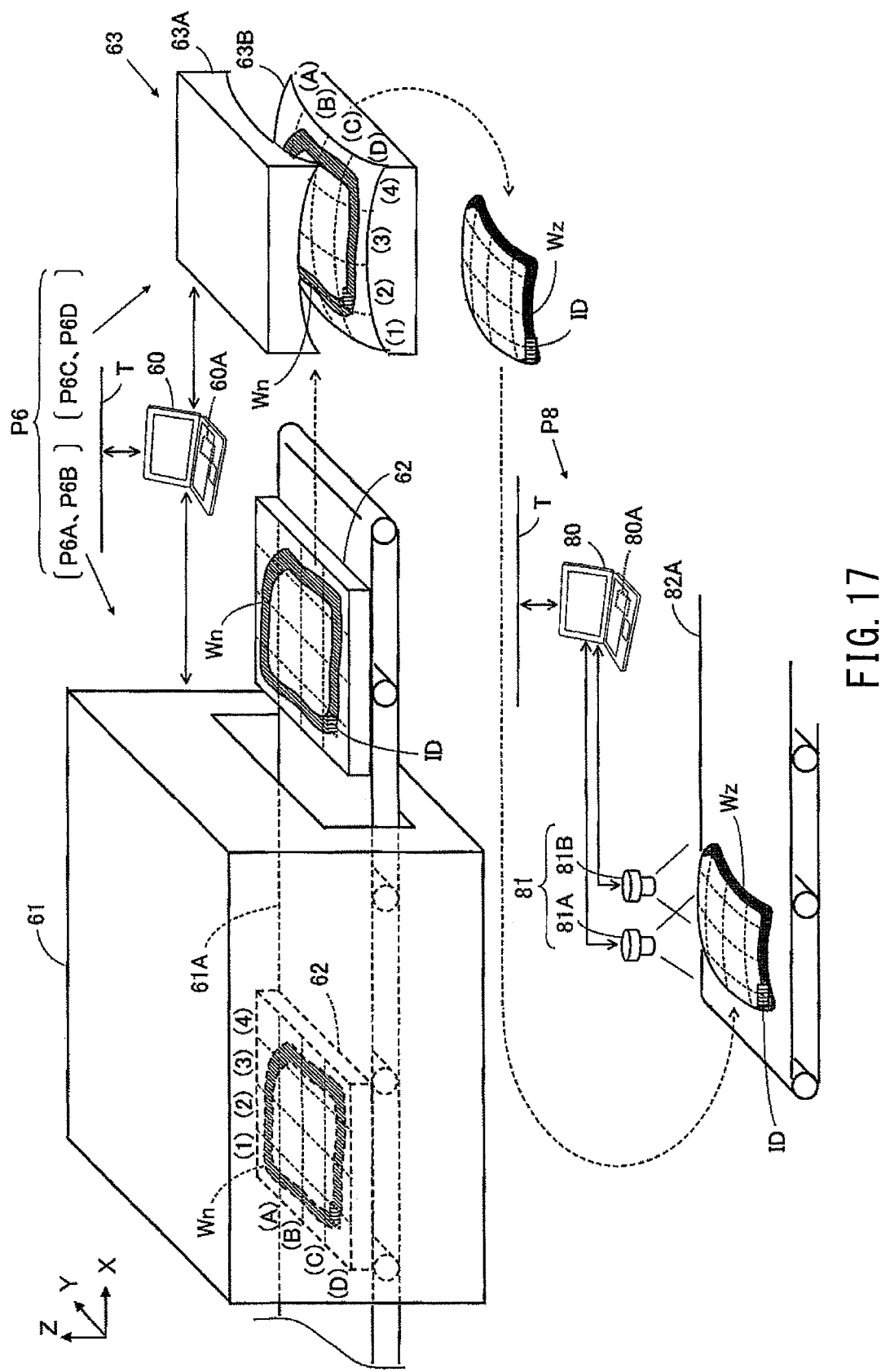
FIG. 17 is a perspective view illustrating an example of a heat press process and an inspection process.

As shown in FIG. 17, the heat press process P6 is implemented by a heat press process management device 60 (e.g., personal computer), a heating device 61, a pressing device 63, etc. The heat press process management device 60 allows the heating device 61 and the pressing device 63 to be operated in accordance with instructions from the total management device 2 (or input instruction from an operator, etc.).

The heat press process P6 includes a heating implementing process P6B, a correction amount acquiring process P6A corresponding to the heating implementing process P6B, a pressing implementing process P6D, a correction amount acquiring process P6C corresponding to the pressing implementing process P6D, etc. These will be described in detail below. The heat press process P6 is one of the post-processing processes.

[Correction Amount Acquiring Process P6A (Corresponding to Heating Implementing Process P6B)]

In a storage 60A of the heat press process management device 60, "Heat Press Processing Condition Information", an example of which is shown in FIG. 6, are stored. The heat press process management device 60 determines a correction amount of each of the areas of the "Temperature Distribution" of the heat press processing condition information in the correction amount acquiring process P6A. This is done prior to the heating implementing process P6B. Specifically, the heat press process management device 60 determines a correction amount of each of the areas of the "Temperature Distribution" of the heat press processing condition information. This may be done based on the pre-shrinkage contour Ls (see FIG. 4) and the target contour Lt (see FIG. 4) corresponding to the individual area of each of the individual areas, the shrinkage rate related information for each of the individual areas and for each of the segmented areas (see FIG. 5), and the heat press processing condition information for each of the individual areas and for each of the segmented areas (see FIG. 6).

[Heating Implementing Process P6B]

The heating implementing process P6B is implemented by the heat press process management device 60, the heating device 61, etc. The heating device 61 may be, for example, a heat retaining tub that includes a conveying device 61A such as a conveyor and a heating table 62 placed on the conveying device 61A, etc. The heating table 62 is segmented similarly to the (segmented) areas (A, 1), (A, 2) . . . (D, 4) (see FIG. 4), which are the virtually segmented area determined in a virtually segmenting process P2A. The heating table 62 is capable of heating each of the segmented areas of the intermediate resin sheet Wn (intermediate product) at different temperatures (different temperature distributions).

The heat press process management device 60 adjusts the temperatures of each (segmented) area of the heating table 62 as needed and based on the temperature distributions of each of the (segmented) areas stored in the heat press processing condition information, shown in FIG. 6. The temperature of each segmented area may also be set based on the correction amount in the above-described correction amount acquiring process P6A. As described-above, heating (post-processing) can be corrected in accordance with the needs for each of the individual areas. This correction may be based on the shrinkage rate related information for each of the individual areas and for each of the segmented areas as well as based on the heat press processing condition information for each of the individual areas and for each of the segmented areas.

[Correction Amount Acquiring Process P6C (Corresponding to Pressing Implementing Process P6D)]

In the storage 60A of the heat press process management device 60, "Heat Press Processing Condition Information", an example of which is shown in FIG. 6, are stored. The heat press process management device 60 determines a correction amount of each of the areas of the "Pressure Distributions" of the heat press processing condition information in the correction amount acquiring process P6C. This is done prior to the pressing implementing process P6D. Specifically, the heat press process management device 60 determines a correction amount for each of the areas of the "Pressure Distribution" of the heat press processing condition information. This correction may be based on the pre-shrinkage contour Ls (see FIG. 4) and the target contour Lt (see FIG. 4) corresponding to the individual area for each of the individual areas, the shrinkage rate related information for each of the individual areas (see FIG. 5), and the heat press processing condition information (see FIG. 6).

[Pressing Implementing Process P6D]

The pressing implementing process P6D is implemented by the heat press process management device 60, the pressing device 63, etc. The pressing device 63 includes an upper die 63A and a lower die 63B. Press surfaces of the upper die 63A and the lower die 63B are segmented similarly as to the (segmented) areas (A, 1), (A, 2) . . . (D, 4) (see FIG. 4) that were virtually segmented in a virtually segmenting process P2A. The press surfaces are capable of pressing and shaping each of the segmented areas of the intermediate resin sheet Wn (intermediate product) at different pressures (different pressure distributions).

The heat press process management device 60 adjusts the pressures of each of the (segmented) areas of the pressing device as needed and based on the pressure distributions of each of the (segmented) areas stored in the heat press processing condition information, as shown in FIG. 6. The pressure may also be adjusted by the correction amount in the above-described correction amount acquiring process P6C. As described above, pressing (post-processing) is corrected in accordance with the needs for each of the individual areas. The pressing amount may be corrected based on the shrinkage rate related information for each of the individual areas and for each of the segmented areas as well as the heat press processing condition information for each of the individual areas and for each of the segmented areas.

Although an example has been described in that each of the segmented areas is heated at different temperatures (temperature distributions) in the heating implementing process P6B and each of the segmented areas is pressed at different pressures (pressure distributions) in the pressing implementing process P6D, it is sufficient to perform at least one of them. The final resin sheet Wz (finished item) can then be obtained by implementing the heating implementing process P6B and the pressing implementing process P6D.

[Inspection Process P8 (FIG. 17, FIG. 18)]

The final resin sheet Wz (finished Item) is subjected to inspection to ensure proper size, shape, etc. in the inspection process P8. The inspection results are fed back to the contour calculating process P2C. As shown in FIG. 17, the inspection process P8 is implemented by the inspection process management device 80 (e.g. personal computer), an inspection device 81, etc. The inspection process management device 80 allows the inspection device 81 to operate in accordance with instructions from the total management device 2 (or input instruction from an operator, etc.).

The inspection device 81 may, for example, be a three dimensional data acquiring device, which may include two image capturing devices 81A, 81B arranged at a predetermined interval. The inspection process management device 80 captures image of the final resin sheet Wz (finished item) from various direction using the two image capturing devices 81A, 81B. These images are then used to measure the three dimensional shape of the final resin sheet Wz. The inspection process management device 80 then determines and stores contour error (error in dimension) information, curvature error (error in shape) information, etc. for each of the segmented areas of each of the individual areas (W1, W2 . . . ), as shown in the example of final product inspection information shown in FIG. 18.

For example, the inspection process management device 80 then transmits final product inspection information (see FIG. 18) to the shrinkage prediction process management device 20 (see FIG. 1) and the heat press process management device 60 via the communication line T. The shrinkage prediction process management device 20, once it has received the final product inspection information, modifies the correction amount, etc. when determining the pre-shrinkage contour Ls in the contour calculating process P2C. These modifications are based on the final product inspection information, which reduces further errors in final product.

It is also possible to determine the correction amount used for correcting machine difference (individual difference) of the heating device 61 and the pressing device 63 based on the final product inspection information. This information can be used to correct the control amount of the heating device 61 and the pressing device 63 by the heat press process management device 60. This allows the heat press processing conditions of the heating device or the pressing device, which may have individual differences, to conform to representative conditions (in this case, heat press processing condition information). Using the heat press processing condition information (see FIG. 6) results in achieving more accurate processing (heat press processing), such that more accurate corrections can be performed in each subsequent intermediate processing and heat press processing (i.e. each post-processing).

The post heat press contour, which is the contour after heat pressing, is also estimated based on the shrinkage rate related information, trimming shape (pre-shrinkage contour Ls), the heat press processing condition information prior to corrections, etc. The heat press processing condition information may be corrected in accordance with the difference between the estimated post heat press contour and the target contour Lt.

[Other Methods for Calculating Pre-Shrinkage Contour Ls]

In the examples described above, the pre-shrinkage contour Ls can be calculated (predicted) for each of the individual areas based on the shrinkage rate related information (see FIG. 5) and the heat press processing condition information (see FIG. 6). This information may be used when calculating the pre-shrinkage contour Ls corresponding to the target contour Lt in the shrinkage prediction process P2. The heat press processing condition information are corrected as needed, given that the following internal processing condition information are to be corrected. Alternative to this example, as shown in [Another Example 1] to [Another Example 3], the following intermediate processing condition information may be corrected in accordance with the needs given that the heat press processing condition information are to be corrected.

Another Example 1

In another example 1, the shrinkage prediction process management device 20 corrects at least some heat press processing condition information in the order of following procedures (1-1) to (1-3) to calculate the final pre-shrinkage contour Ls.
(1-1) The shrinkage prediction process management device 20 estimate a (provisional) pre-shrinkage contour based on the shrinkage rate related information and the heat press processing condition information (before correction). The shrinkage rate related information is set for each of the individual areas and for each of the segmented areas (see FIG. 5), and the heat press processing condition information is set for each of the individual areas and for each of the segmented areas (FIG. 6).
(1-2) The shrinkage prediction process management device 20 corrects at least some heat press processing condition information, such that the shrinkage amount is reduced to fit within the (provisional) pre-shrinkage contour if the estimated (provisional) pre-shrinkage contour does not fit within the individual area. When correcting at least some of the heat press processing condition information, first, the corrected heat press processing condition information is determined based on the heat press processing condition information for each of the individual areas and for each of the segmented areas and the intermediate processing condition information for each of the individual areas and for each of the segmented areas. The heat press processing condition information is then updated with the determined corrected information. Various processing condition in the intermediate processing condition information are set for each of the individual areas and for each of the segmented areas for use when performing the intermediate processing (in this case, coating, printing, and trimming).
(1-3) The shrinkage prediction process management device 20 calculates the final pre-shrinkage contour Ls based on the shrinkage rate related information for each of the individual areas and for each of the segmented areas and based on the (corrected and updated (overwritten)) heat press processing condition information (corresponding to the corrected heat press processing condition information) for each of the individual areas and for each of the segmented areas.

In subsequent intermediate processing and heat press processing (i.e. post-processing), the corrected and updated (overwritten) heat press processing condition information are used when using the heat press processing condition information.

Another Example 2

In another example 2, the shrinkage prediction process management device 20 corrects at least some of the heat press processing condition information such that the shrinkage amount is reduced (or at least the distortion due to shrinkage is reduced) in the order of following procedures (2-1) to (2-3). This may be done even when the (provisional) pre-shrinkage contour fits within the individual areas in the above-described "Another Example 1" used to calculate the final pre-shrinkage contour Ls.
(2-1) The shrinkage prediction process management device 20 estimates the (provisional) pre-shrinkage contour based on the shrinkage rate related information and the heat press processing condition information (before correction). The shrinkage rate related information are set for each of the individual areas and for each of the segmented areas (see FIG. 5), and the heat press processing condition information are set for each of the individual areas and for each of the segmented areas (see FIG. 6).
(2-2) The shrinkage prediction process management device 20 corrects at least some of the heat press processing condition information such that the shrinkage amount is reduced (or at least the distortion due to shrinkage is reduced). This may be done regardless of whether or not the estimated (provisional) pre-shrinkage contour fits within the individual area. When correcting at least some of the heat press processing condition information, the corrected heat press processing condition information is determined using the same process as in the above-described (1-2). The heat press processing condition information is updated (overwritten) with the determined corrected information. Various processing condition in the intermediate information are set for each of the individual areas and for each of the segmented areas for use when performing the intermediate processing (in this case, coating, printing, and trimming).
(2-3) The shrinkage prediction process management device 20 calculates the final pre-shrinkage contour Ls based on the shrinkage rate related information for each of the individual areas and for each of the segmented areas, and based on the (corrected and updated (overwritten)) heat press processing condition information for each of the individual areas and for each of the segmented areas.

In subsequent intermediate processing and heat press processing (i.e. post-processing), the updated (overwritten) heat press processing condition information are used if using the heat press processing condition information.

Another Example 3

In another example 3, the shrinkage prediction process management device 20 corrects at least some of the heat press processing condition information such that, for example, a shrinkage amount and distortion are reduced (adjusted) in the processes described in "Another Example 2". That can allow the pre-shrinkage contour to have a preset set pre-shrinkage contour (contour preset to have a slightly greater size than the target contour Lt). The heat press processing is then performed using at least partially corrected heat press processing condition information for each of the individual areas and for each of the segmented areas.

Also, in the intermediate processing, which is processing other than the heat press processing (in this case, coating, printing and trimming), uniform processing corresponding to the set pre-shrinkage contour is performed without performing particularly individually corrected processing.

Figure 19:
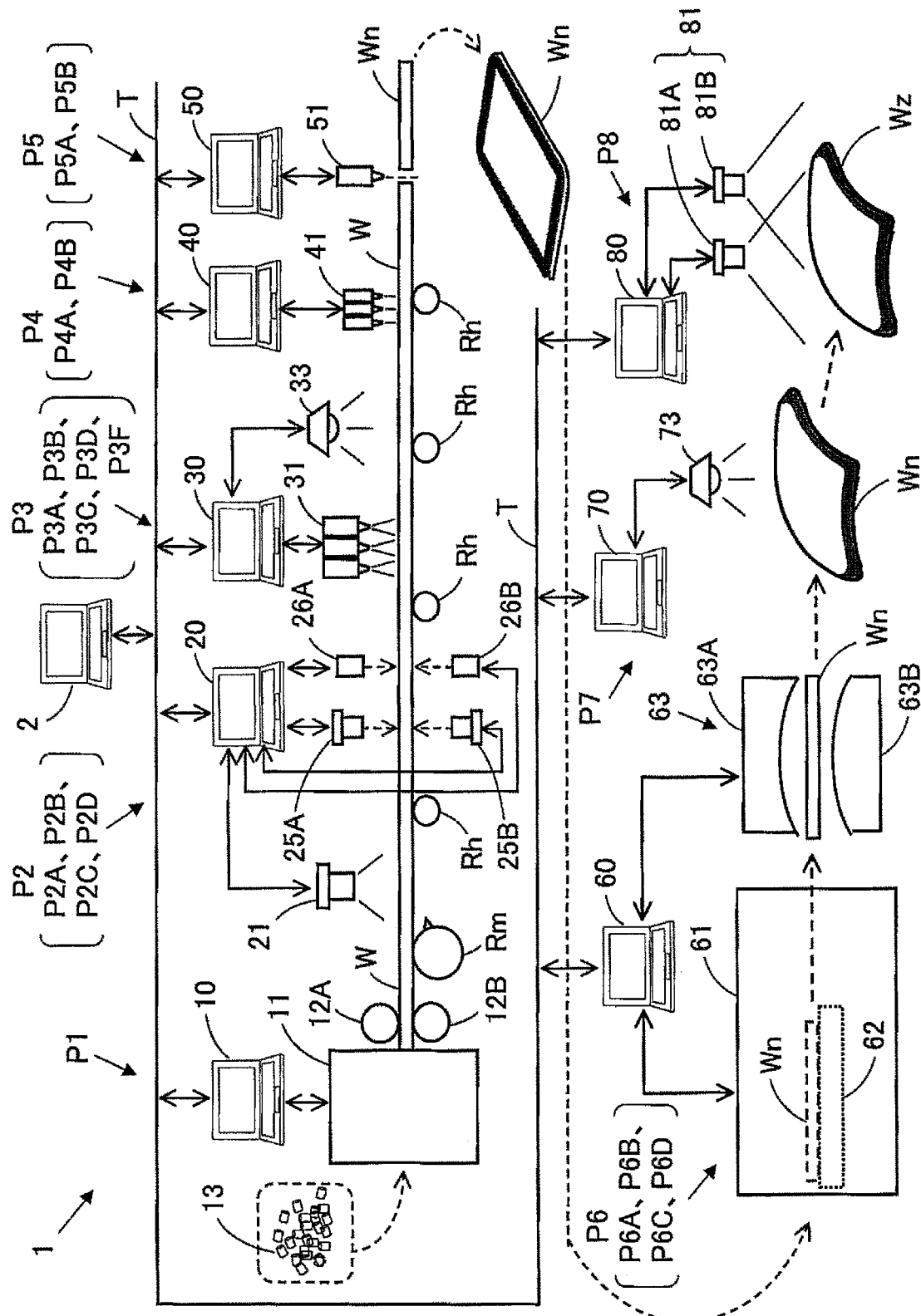
FIG. 19 is a view illustrating an entire resin sheet manufacturing process according to the second and third embodiments.

Second Embodiment (FIG. 19 to FIG. 21)

Hereinafter, a resin sheet manufacturing process according to a second embodiment will be described with reference to FIG. 19 to FIG. 21. FIG. 19 schematically shows an overview of an entire resin sheet manufacturing process according to the second embodiment. According to the resin sheet manufacturing process of the second embodiment shown in FIG. 19, the coating curing process P3E (process to allow the coating to be completely cured) in the coating process P3 of the first embodiment shown in FIG. 1 is changed to a coating semi-curing process P3F. Also, a coating completely curing process P7 used to completely cure the coating is added between the heat press process P6 and the inspection process P8 of the second embodiment. Accordingly, setting the contents in the coating condition per area setting process in the coating process P3 is different. In the manufacturing process shown in FIG. 19, the process management system 2 is composed of a total management device 2 and management devices (10, 20, 30, 40, 50, 60, 70, 80) for each process. Hereinafter, the differences from the first embodiment will be mainly described, while the items similar to the first embodiment will not be described. "Completely cured state" refers to a state in which the coating is substantially completely cured, and "semi-cured state" refers to a state in the curing process that has not yet reached the completely cured state.

[Coating Condition Per Area Setting Process P3C (FIG. 20, FIG. 21)]

In the second embodiment, in the coating condition per area setting process P3C, the coating process management device 30 sets a "curing degree of coating in a semi-cured state" for each of the individual areas and for each of the segmented areas. This may be set in accordance with the curvature based on the curvature related information for each of the individual areas and for each of the segmented areas. That is, "coating condition per area setting process" according to the second embodiment is "curing degree of coating for each of the areas and for each of the segmented areas".

In the storage device 30A of the coating process management device 30, curvature/target curing degree characteristics (see FIG. 20), which is a target curing degree corresponding to the curvature of the resin sheet, are set and stored. The coating process management device 30 determines the target curing degree based on the maximum curvature corresponding to the (segmented) area and based on the curvature/target curing degree characteristics for each of the (segmented) areas associated to the individual areas W1, W2, W3 of the resin sheet. The coating process management device 30 then stores (sets) the determined target curing degree in the corresponding areas of the "target curing degree" of the curing degree information (see FIG. 21). In the second embodiment, the curing degree in the semi-cured state is set to be lower in the segmented areas with a greater curvature than in the segmented areas with a smaller curvature.

In the above-described curing degree information (see FIG. 21), the "maximum curvature" when shrunk to the target contour Lt and the "target curing degree" corresponding to the maximum curvature are set for each of the individual areas and for each of the segmented areas. This may be done with taking the shrinkage of the intermediate resin sheet Wn (intermediate product) due to the heat press process P6 into account. However, if the shrinkage rate of the intermediate resin sheet Wn (intermediate product) is, for example, about 1 to 5%, the "maximum curvature" and the "target curing degree" for each of the individual areas and for each of the segmented areas in the target contour Lt may be stored (set) as the curing degree information (see FIG. 21) assuming that the there is almost no shrinkage due to the heat press process (given that the intermediate resin sheet Wn (intermediate product) will be shaped into a final resin sheet Wn (finished item) with almost no shrinkage). Further, instead setting a different target curing degree for each of the individual areas and for each of the segmented areas, the lowest target curing degree among the determined target curing degrees may be used for all the segmented areas within the individual area.

[Coating Implementing Process P3D]

In the coating implementing process P3D, the coating process management device 30 controls the coating device 31 to apply coating in the range of the pre-shrinkage contour Ls (see FIG. 3 and FIG. 4). Accordingly, coating (during intermediate processing or post-processing), which has been corrected for each of the individual areas, is performed using the pre-shrinkage contour based on the shrinkage rate related information for each of the individual areas and for each of the segmented areas and based on the heat press processing condition information for each of the individual areas and for each of the segmented areas.

Further, when performing coating, the coating process management device 30 applies coating on each segmented areas so as to have a certain coating thickness in each area.

[Coating Semi-Curing Process P3F]

In a coating semi-curing process P3F, the coating process management device 30 controls a curing device 33 such that the curing degree is different for each of the individual area and for each of the segmented area. The curing degree may be based on the curing degree information. For example, the curing device 33 may be a device for irradiating ultraviolet rays. In this case, the coating process management device 30 controls the curing device 33 at a time corresponding to a target curing degree and at an irradiation intensity corresponding to the target curing degree for each of the individual areas and for each of the segmented areas. This may be done using a shielding plate, etc. corresponding to each of the segmented areas.

As shown by the curvature/target curing degree characteristics in FIG. 20, the curing degree in a semi-cured state is set to be lower for segmented areas with a greater curvature than in the segmented areas with a smaller curvature. That is, during the heat press processing, the coating of the segmented area having a greater curvature is cured to a lower curing degree. The lower curing degree results in increased elasticity, thereby reducing the occurrence of cracks, such as breakages or crazes.

[Coating Completely Curing Process P7 (FIG. 19)]

As shown in FIG. 19, the coating completely curing process P7 is implemented by a coating completely curing process management device 70 (e.g. personal computer), a curing device 73, etc. The coating completely curing process management device 70 is connected to the communication line T and allows the curing device 73 to operate in accordance with instructions from the total management device 2 (or input instructions from an operator, etc.). The curing device 73 may be a device that irradiates ultraviolet rays, for example, if the coating agent is an ultraviolet curing type paint. In addition, the coating completely curing process P7 is implemented after the heat press process P6 and before the inspection process P8.

The coating on the intermediate resin sheet Wn (intermediate product), after the heat press process P6 has been completed, remains in a semi-cured state. In the coating completely curing process P7, the coating completely curing process management device 70 controls the curing device 73 to cure the coating from the semi-cured state to the completely cured state.

Third Embodiment (FIG. 19, FIG. 22, FIG. 23)

Hereinafter, a resin sheet manufacturing process according to the third embodiment will be described with reference to FIG. 19, FIG. 22, and FIG. 23. The entire resin sheet manufacturing process of the third embodiment is substantially the same as that of the second embodiment shown in FIG. 19, but the following points are different from the second embodiment. The resin sheet manufacturing process of the third embodiment is different from the resin sheet manufacturing process of the second embodiment in that the setting contents of the coating condition per area setting process P3C, implementation contents of the coating implementing process P3D, and implementation contents of the coating semi-curing process P3F of the third embodiment are different for the coating process P3. The differences from the second embodiment will mainly be described, while the items similar to the second embodiment will not be described. The "completely cured state" generally refers to a state in which the coating is substantially completely cured, and "semi-cured state" generally refers to a state in the process that has not yet reached the completely cured state. These terms are substantially similar to the terms used for the second embodiment.

[Coating Condition Per Area Setting Process P3C (FIG. 20 and FIG. 21)]

In the third embodiment, the coating process management device 30 sets the "coating thickness" for each of the individual areas and for each of the segmented areas in accordance with the curvature in the coating condition per area setting process P3C. The curvature may depend on the curvature related information for each of the individual areas and for each of the segmented areas. That is, the "coating condition per area" in the third embodiment corresponds to "coating thickness for each of the individual areas and for each of the segmented areas."

The "coating condition per area" according to the first embodiment is also described as generally corresponding to the "coating thickness for each of the individual areas and for each of the segmented areas", however, the following points pertaining to the third embodiment are different from the first embodiment. In the third embodiment, the heat press processing is performed while the coating is in the semi-cured state. On the other hand, in the first embodiment the heat press processing is performed after the coating has reached the completely cured state. In the first embodiment, the coating thickness is made to be thinner in the segmented areas having a greater curvature than in the segmented areas having a smaller curvature. This is done so as to reduce the occurrence of cracks in the coating, which has been completely cured, at the locations having a greater curvature. In contrast, according to the third embodiment, a semi-cured and elastic coating is used during the heat press processing, which has a lower possibility of cracking. Since the semi-cured coating is somewhat elastic, a thick coating is applied in the segmented areas having a great curvature, in anticipation that the coating will be stretched and thinned in these areas having a great curvature.

In the storage device 30A of the coating process management device 30, curvature/target coating thickness characteristics (see FIG. 22) may be stored. These characteristics may be used to set a target coating thickness based on a curvature of the resin sheet. The coating process management device 30 determines a target coating thickness for each of the (segmented) areas associated with the individual area W1 corresponding to the resin sheet. The target coating thickness is determined based on the maximum curvature (maximum curvature based on the curvature related information) corresponding to each of the (segmented) areas and based on the curvature/target coating thickness characteristics. The coating process management device 30 then stores (sets) the determined target coating thickness in the area of the coating thickness information (see FIG. 23) corresponding to the "target coating thickness". In the third embodiment, the thickness of the coating is set to be thicker in the segmented areas having a greater curvature than in the segmented areas having a smaller curvature.

In the heat press process P6 of the third embodiment, the intermediate resin sheet Wn (intermediate product) shrinks. Taking this shrinkage into account, in the coating thickness information (see FIG. 23), the "maximum curvature" when shrunk to the target contour Lt and the "target coating thickness" corresponding to the maximum curvature for each of the individual areas and for each of the segmented areas is set. However, in some situations, the shrinkage rate of the intermediate resin sheet Wn (intermediate product) may be, for example, about 1 to 5%. In this case, it may be assumed that there is almost no shrinkage due to the heat press process P6. That is, it could be assumed that the intermediate resin sheet Wn (intermediate product) was shaped into the final resin sheet Wz (finished item) with almost no shrinkage. In this case, the "maximum curvature" and the "target coating thickness" for each of the individual areas and for each of the segmented areas with the target contour Lt may be stored (set) as the coating thickness information (see FIG. 23). Further, instead of setting the different coating thickness for each of the individual areas and for each of the segmented areas, the thickest target coating thickness among the target coating thicknesses determined for each of the individual areas and for each of the segmented areas may be used as the coating thickness for all segmented areas within the individual areas.

[Coating Implementing Process P3D]

In the coating implementing process P3D of the third embodiment, the coating process management device 30 controls the coating device 31 to apply the coating in the range of the pre-shrinkage contour Ls (see FIG. 3 and FIG. 4). In this way, the coating (intermediate processing and post-processing), which has been corrected for each of the individual areas, is implemented using the pre-shrinkage contour. The pre-shrinkage contour is based on the shrinkage rate related information for each of the individual areas and for each of the segmented areas and on the heat press processing condition information for each of the individual areas and for each of the segmented areas.

Further, when applying the coating, the coating process management device 30 applies the coating with a coating thickness set for each of the (segmented) areas based on the coating thickness information (see FIG. 23).

[Coating Semi-Curing Process P3F]

In the coating semi-curing process P3F of the third embodiment, the coating process management device 30 controls the curing device 33. Specifically, the coating process management device 30 controls the curing device 33 so that all segmented areas in the individual areas have substantially the same curing degree, so as to be in the preset semi-cured state.

During the heat press processing, the occurrence of cracks, such as breakages or crazes, may be reduced even when the semi-cured elastic coating is bent. In the segmented areas having a greater curvature, the coating is set to be thick in advance based on the coating thickness information (see FIG. 23), which allows the coating to be stretched along the curved shape such that the coating becomes thinner. This achieves substantially the same coating thickness at locations with a greater curvature as the other locations having a smaller curvature.

[Coating Completely Curing Process P7 (FIG. 19)]

The coating completely curing process P7 of the third embodiment is substantially the same as the coating completely curing process P7 of the second embodiment. As shown in FIG. 19, the coating completely curing process P7 of the third embodiment is implemented by the coating completely curing process management device 70 (e.g., personal computer), the curing device 73, etc. The coating completely curing process management device 70 allows the curing device 73 to operate in accordance with instruction from the total management device 2 (or input instruction from an operator, etc.). The curing device 73 may be a device that irradiates ultraviolet rays, for example, if the coating agent is an ultraviolet curing type paint. In addition, the coating completely curing process P7 is implemented after the heat press process P6 and before the inspection process P8.

The coating of the intermediate resin sheet Wn (intermediate product) is still in a semi-cured state after completion of the heat press process P6. In the coating completely curing process P7, the coating completely curing process management device 70 controls the curing device 73 to cure the coating to the completely cured state.

As described-above, in the intermediate processing method of an extruded resin sheet of the first to third embodiments, and in the heat press processing method of the in intermediate resin sheet Wn (intermediate product) subjected to the intermediate processing on the extruded resin sheet, the extruded resin sheet is virtually segmented into a plurality of areas (individual areas, segmented areas). Then, a shrinkage rate is determined for each area. Intermediate processing and heat press processing (which may be considered post-processing) are appropriately corrected for each area (for each individual area and for each segmented area). This results in a reduction of waste of the extruded resin sheets (corresponding to the base material) and the coating agent. This also reduces an occurrence of printing misalignment, thereby allowing one to produce products with more stable accuracy. The accuracy can be further improved by feeding back the inspection results, such as a size, shape, etc., of the final resin sheet Wz (finished item).

Furthermore, for example, processes from the extrusion molding process P1 to the trimming process P5, examples of which are shown in FIG. 1 and FIG. 19, may be implemented in a factory of Company A to prepare the intermediate resin sheet Wn (intermediate product). The processes from the heat press process P6 to the inspection process P8 may be implemented in a factory of Company B. In this case, the total management device 2, the heat press process management device 60, (the coating completely curing process management device 70), and the inspection process management device 80 may all be connected to each other via the internet. In this case, the heat press processing condition information (see FIG. 6), which is utilized in the heat press process P6, may be prepared by the shrinkage prediction process management device 50 and may be transmitted to the heat press process management device 60 via the communication line T, to the total management device 2, and to the internet. Also, information other than the heat press processing condition information may be transmitted from Company A to Company B. For example, in addition to providing the heat press processing condition information, information for the heat press process management device 60, the heating device 61, and the pressing device 63, embodiments of which are shown in FIG. 1, may be prepared be prepared by Company A and then provided to Company B.

In the manufacturing process described in the first to third embodiments, various processes were disclosed for correcting the intermediate processing process and the heat press process. The process for correcting the processing conditions (correction for each of the individual areas and for each of the segmented areas) may be at least one of the coating process, the printing process, the trimming process, and the heat press process.

The intermediate processing method of an extruded resin sheet and the heat pressing method of the intermediate resin sheet subjected to the intermediate processing of one embodiment of the present disclosure shall not be limited to the processing methods described in the present embodiments. Various modifications, additions, and deletions are possible without departing from the gist of one of the embodiments of the present disclosure. For example, although the thickness of the resin sheet as described in the present embodiments is about several millimeters [mm], the thickness of the target resin sheet shall not particularly be limited. In one embodiment, the target resin sheet may be a resin panel type having a thickness of about several 10's of millimeters [mm]. Moreover, the material of the resin sheet shall not particularly be limited.

The shrinkage rate related information (see FIG. 5), the heat press processing condition information (see FIG. 6), the contour information (see FIG. 7), the curvature/maximum allowable coating thickness characteristics (see FIG. 9), the coating thickness information (see FIG. 10), the final product inspection information (see FIG. 18), the curing degree information (see FIG. 21), the coating thickness information (see FIG. 23), etc. are intended to show some examples. The type of information should not be limited to these items and embodiments. Also, at least one of temperature of the extruded resin sheet subjected to the extrusion molding corresponding to the individual areas, the temperature of a roller used for the extrusion molding, the rotation number of the roller, the sheet thickness distribution for each of the segmented areas, the temperature distribution for each of the segmented areas, and the refractive index distribution for each of the segmented areas may be stored for use in the shrinkage related information. Further, at least one of the heating distribution for each of the segmented areas corresponding to the individual areas and the pressure distribution for each of the segmented areas may be stored in the heat press processing condition information.

In the present embodiments, although an example of a device using an ink-jet method has been described as an example of the coating device, an example of a device using the ink jet method has been described as an example of an printing device, and an example of a laser cutter has been described as an example of the trimming device, the disclosure shall not be limited thereto. Also, coating agents, paints for printing, etc. shall not be particularly limited to those described.

Greater than or equal to (≥), less than or equal to (≤), greater than (>), less than (<), etc. may or may not include an equal sign. The numerical values that were used for describing the above embodiments are only some examples, and the scope shall not be limited to these numerical values.

The above-described management devices 10, 20, 30, 40, 50, 60, 80 include at least one programmed electronic processor. The management devices contain a memory for storing instruction or software executed by the electronic processor to achieve at least one functions of the management devices described in the present application. For example, in some embodiments, the management device may be implemented as a microprocessor having a separate memory.

The storage device may include a volatile and/or a nonvolatile memory. Examples of suitable storage devices may include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, any other suitable storage medium, or any combination thereof.

The software may include, for example, firmware, one or more applications, program data, filters, rules, one or more program modules, and/or other executable instructions.

The invention claimed is:

1. An intermediate processing method of a strip-like, extrusion-molded resin sheet for manufacturing a plurality of intermediate resin sheets, each of which is to be subjected to a heat press processing, comprising the steps of:
   virtually segmenting the strip-like resin sheet into a plurality of individual areas, each of which is associated with a corresponding sheet of the plurality of intermediate resin sheets;
   virtually segmenting each individual area of the plurality of individual areas, which have been virtually segmented, into a plurality of segmented areas;
   acquiring shrinkage rate related information related to a shrinkage rate of each segmented area of the plurality of segmented areas of each individual area;
   calculating corrected intermediate processing conditions for each individual area based on the shrinkage rate of each segmented area; and
   implementing an intermediate processing of each individual area of each segmented area based on the corresponding corrected intermediate processing conditions, wherein:
   the intermediate processing is performed after extrusion-molding of the strip-like, extrusion-molded resin sheet and before the heat press processing of the plurality of intermediate resin sheets.

2. The intermediate processing method of the strip-like, extrusion-molded resin sheet according to claim 1, the method further comprises:
   before implementing the intermediate processing, virtually setting a target contour within each individual area, where the target contour corresponds to a contour of the intermediate resin sheet after completion of the intermediate processing and after completion of the heat press processing;
   before implementing the intermediate processing, calculating a pre-shrinkage contour, which is a contour of the corresponding intermediate resin sheet before shrinking for each individual area of each segmented area based on the shrinkage rate related information;
   before implementing the intermediate processing, virtually setting the pre-shrinkage contour for each individual area of each segmented area as one of the corrected intermediate processing conditions used for implementing the intermediate processing.

3. The intermediate processing method of the strip-like, extrusion-molded resin sheet according to claim 2,
   wherein implementing the intermediate processing step includes a coating implementing process to apply a coating on a surface of the strip-like, extrusion-molded resin sheet, and
   wherein the coating implementing process is performed for each individual area of the plurality of individual areas within a range of the pre-shrinkage contour corresponding to such each individual area.

4. The intermediate processing method of the strip-like, extrusion-molded resin sheet according to claim 2,
   wherein implementing the intermediate processing step includes a print implementing process to apply printing on a surface of the strip-like, extrusion-molded resin sheet, and
   wherein an area of the surface to which the printing is to be applied is based on a shape and a contraction scale for each individual area of the plurality of individual areas, the shape and contraction scale being based on at least one of: the pre-shrinkage contour corresponding to each individual area, the target contour, the shrinkage rate related information corresponding to each segmented area, and heat press processing condition information of the heat press processing.

5. The intermediate processing method of the strip-like, extrusion-molded resin sheet according to claim 2,
   wherein implementing the intermediate processing step includes a trimming implementing process in which the pre-shrink contour of each individual area of the plurality of individual areas is cut from the strip-like, extrusion-molded resin sheet.

6. The intermediate processing method of the strip-like, extrusion-molded resin sheet according to claim 1,
   wherein the shrinkage rate related information comprises at least one of:
   a temperature of each individual area of the plurality of individual areas of the strip-like, extrusion-molded resin sheet,
   a temperature of a roller used for the extrusion molding,
   a rotation number of the roller,
   a sheet thickness of each of the segmented areas of each individual area of the plurality of individual areas,
   a temperature of each of the segmented areas of each individual area of the plurality of individual areas, and
   a refractive index of each of the segmented areas of each individual area of the plurality of individual areas.

7. The intermediate processing method of the strip-like, extrusion-molded resin sheet according to claim 1,
   wherein calculating corrected intermediate processing conditions for each individual area of the plurality of individual areas is further based on heat press processing condition information of a heat press to be used for heat press processing the plurality of intermediate resin sheets,
   wherein the heat press processing condition information comprises at least one of:

a temperature of each segmented area of the heat press, each segment corresponding to each of the segmented areas of each individual area of the plurality of individual areas, and a pressure force of each of the segmented areas of the heat press.

8. A heat press processing method of an intermediate resin sheet, comprising the steps of:

virtually segmenting a strip-like, extrusion-molded resin sheet into individual areas corresponding to intermediate resin sheets;

virtually segmenting each of the virtually segmented individual areas into segmented areas;

acquiring shrinkage rate related information related to a shrinkage rate of each segmented area of each individual area;

intermediate processing the strip-like, extrusion-molded resin sheet to form the intermediate resin sheets, the intermediate processing occurring after extrusion-molding and before heat press processing;

heat press processing each of the intermediate resin sheets, the heat press processing being implemented based on:

the shrinkage rate related information corresponding to each of the segmented areas of the intermediate resin sheet, corrected heat press processing condition information, the heat press processing condition information being processing condition information of the heat press processing for each of the segmented areas, and intermediate processing condition information, which is processing condition information of each of the segmented areas during intermediate processing.

9. A heat press processing method of an intermediate resin sheet, comprising the steps of:

virtually segmenting a strip-like, extrusion-molded resin sheet into individual areas corresponding to intermediate resin sheets;

virtually segmenting each of the virtually segmented individual areas into segmented areas;

acquiring shrinkage rate related information related to a shrinkage rate of each segmented area;

acquiring heat press processing condition information related to one or more heat press processing condition of at least some of the segmented area of the strip-like, extrusion-molded resin sheet;

correcting intermediate processing information, which is processing information used for intermediate processing, for each of the segmented areas of the strip-like, extrusion-molded resin sheet based on the shrinkage rate related information and the heat press processing condition information;

intermediate processing the strip-like, extrusion-molded resin sheet to form a first intermediate resin sheet using the corrected intermediate processing information, the intermediate processing occurring after extrusion-molding and before heat press processing; and heat press processing the first intermediate resin sheet based on the heat press processing condition information.

10. The heat press processing method of the intermediate resin sheet according to claim 8, wherein the shrinkage rate related information comprises at least one of:

a temperature of each individual area of the strip-like, extrusion-molded resin sheet, a temperature of a roller used for the extrusion molding, a rotation number of the roller, a sheet thickness of each segmented area of the strip-like, extrusion-molded resin sheet, a temperature of each of the segmented areas of the strip-like, extrusion-molded resin sheet, and a refractive index of each of the segmented areas of the strip-like, extrusion-molded resin sheet.

11. The heat press processing method of the intermediate resin sheet according to claim 8, wherein the heat press processing condition information comprises at least one of:

a heating temperature to which each segmented area of the intermediate resin sheets are to be heated, and a pressure to which each segmented area of the intermediate resin sheets is to be pressed.

12. The heat press processing method of an intermediate resin sheet according to claim 9, further comprising the steps of:

inspecting the heat press processed first intermediate resin sheet;

correcting the heat press processing condition information based on the inspection of the heat press processed first intermediate resin sheet; and heat press processing a second intermediate resin sheet based on the corrected heat press processing condition information.

13. The heat press processing method of the intermediate resin sheet according to claim 9, wherein the shrinkage rate related information comprises at least one of:

a temperature of each individual area of the strip-like, extrusion-molded resin sheet, a temperature of a roller used for the extrusion molding, a rotation number of the roller, a sheet thickness of each of the segmented areas of the strip-like, extrusion-molded resin sheet, a temperature of each of the segmented areas of the strip-like, extrusion-molded resin sheet, and a refractive index of each of the segmented areas of the strip-like, extrusion-molded resin sheet.

14. The heat press processing method of the intermediate resin sheet according to claim 9, wherein the heat press processing condition information comprises at least one of:

a heating temperature to which each segmented area of the intermediate resin sheets is to be heated, and a pressure to which each segmented area of the intermediate resin sheets is to be pressed.

* * * * *